US012666116B2

(12) United States Patent
Chen et al.

(10) Patent No.: US 12,666,116 B2
(45) Date of Patent: Jun. 23, 2026

(54) VIDEO DISPLAY METHOD AND APPARATUS, VIDEO PROCESSING METHOD, APPARATUS, AND SYSTEM, DEVICE, AND MEDIUM

(71) Applicant: BEIJING BYTEDANCE NETWORK TECHNOLOGY CO., LTD., Beijing (CN)

(72) Inventors: Qi Chen, Beijing (CN); Shiwen Zhou, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/256,014

(22) PCT Filed: Nov. 15, 2021

(86) PCT No.: PCT/CN2021/130581
§ 371 (c)(1),
(2) Date: Jun. 5, 2023

(87) PCT Pub. No.: WO2022/121626
PCT Pub. Date: Jun. 16, 2022

(65) Prior Publication Data
US 2024/0107127 A1     Mar. 28, 2024

(30) Foreign Application Priority Data
Dec. 7, 2020   (CN) .......................... 202011437788.4

(51) Int. Cl.
*H04N 21/81*     (2011.01)
*G06V 30/19*     (2022.01)
(Continued)

(52) U.S. Cl.
CPC ..... *H04N 21/816* (2013.01); *G06V 30/19173* (2022.01); *H04N 21/4312* (2013.01); *H04N 21/4318* (2013.01); *H04N 21/4884* (2013.01)

(58) Field of Classification Search
CPC ............ H04N 21/816; H04N 21/4312; H04N 21/4318; H04N 21/4884; G06V 30/19173
See application file for complete search history.

(56) References Cited

U.S. PATENT DOCUMENTS 10,999,566 B1 * 5/2021 Mahyar ................. G06F 40/166
2008/0284910 A1   11/2008 Erskine et al.
(Continued)

FOREIGN PATENT DOCUMENTS

CN        107172485 A      9/2017
CN        108322800 A      7/2018
(Continued)

OTHER PUBLICATIONS

International Search Report (with English translation) and Written Opinion issued in PCT/CN2021/130581, dated Feb. 10, 2022, 13 pages provided.

*Primary Examiner* — Nnenna N Ekpo
(74) *Attorney, Agent, or Firm* — Astute IP Law Group

(57) ABSTRACT

A video display method and apparatus, a video processing method, apparatus, and system, a device, and a medium. The video display method comprises: receiving a video generation operation for original data, wherein the original data is used for obtaining a target text, and the video generation operation is used for triggering the generation of a target video corresponding to the target text (S210); and in response to the video generation operation, displaying a generated target video, wherein the video elements of the target video comprise a caption text and a multimedia material corresponding to the caption text, the caption text is generated according to the target text, and the multimedia
(Continued)

material is obtained according to the caption text (S220). According to the video display method and apparatus, the video processing method, apparatus, and system, the device, and the medium, the time cost of making a video can be reduced, and the quality of a made video can be improved.

19 Claims, 14 Drawing Sheets

(51) Int. Cl.
   *H04N 21/431*　　　(2011.01)
   *H04N 21/488*　　　(2011.01)

(56)　　　　　　　　References Cited

U.S. PATENT DOCUMENTS

2020/0359104 A1 *　11/2020　Luo ..................... H04N 21/4884
2021/0375321 A1 *　12/2021　Zhou ..................... G06F 3/0485

FOREIGN PATENT DOCUMENTS

| CN | 108965737 A | 12/2018 |
|----|-------------|---------|
| CN | 109257659 A | 1/2019 |
| CN | 109729420 A | 5/2019 |
| CN | 109756751 A | 5/2019 |
| CN | 111787395 A | 10/2020 |
| CN | 112579826 A | 3/2021 |

* cited by examiner

701

702

0:05/0:10

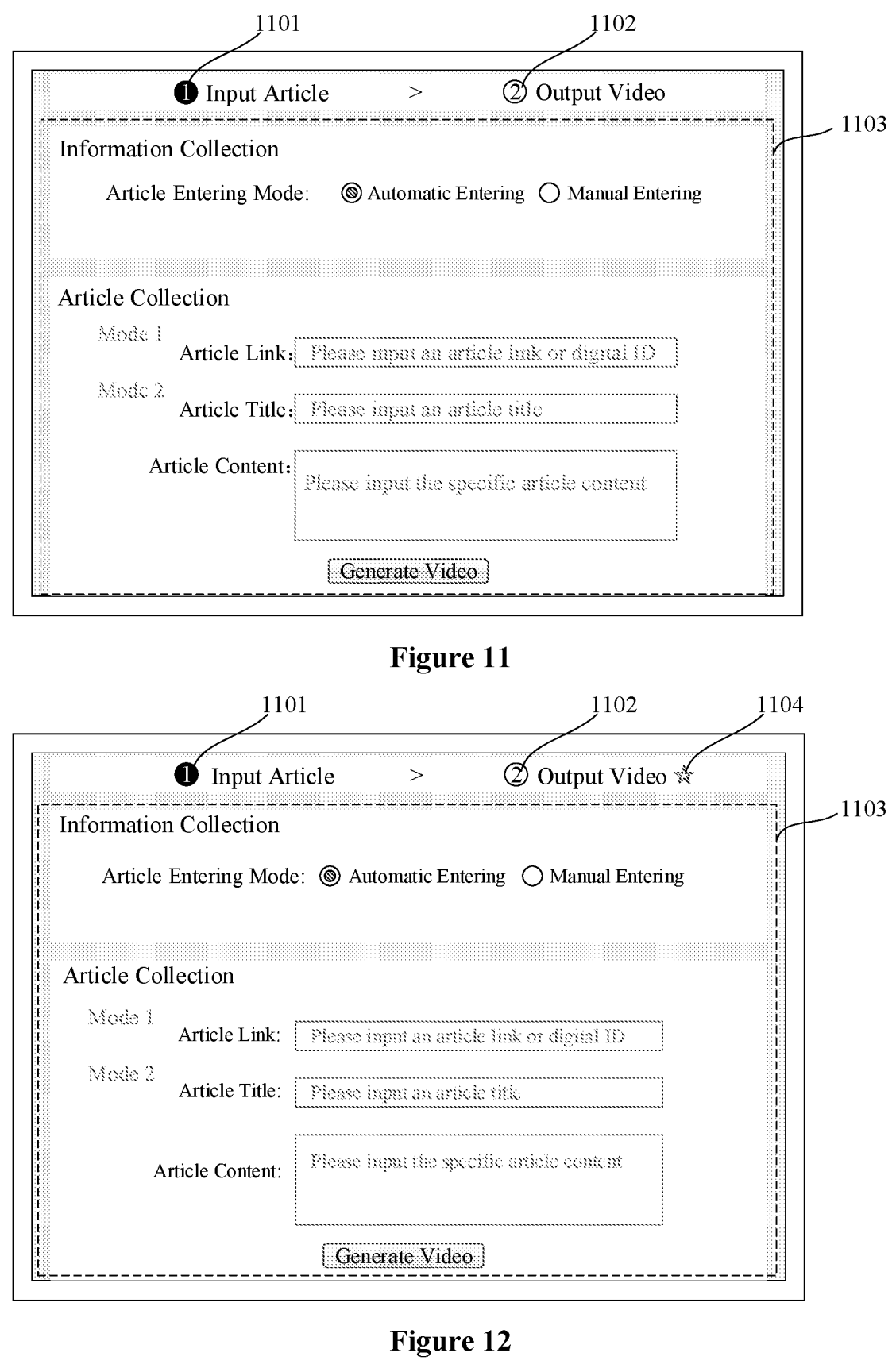

1101                                        1102

❶ Input Article          >          ② Output Video                    1103

Information Collection

Article Entering Mode:    ◎ Automatic Entering   ○ Manual Entering

Article Collection

Mode 1
            Article Link:  Please input an article link or digital ID

Mode 2
            Article Title:  Please input an article title

Article Content:  Please input the specific article content

Generate Video

❶ Input Article          >          ② Output Video ✿

Information Collection                                          1103

Article Entering Mode: ◎ Automatic Entering   ○ Manual Entering

Article Collection

Mode 1
            Article Link:   Please input an article link or digital ID

Mode 2
            Article Title:   Please input an article title

Article Content:   Please input the specific article content

Generate Video

Figure 12

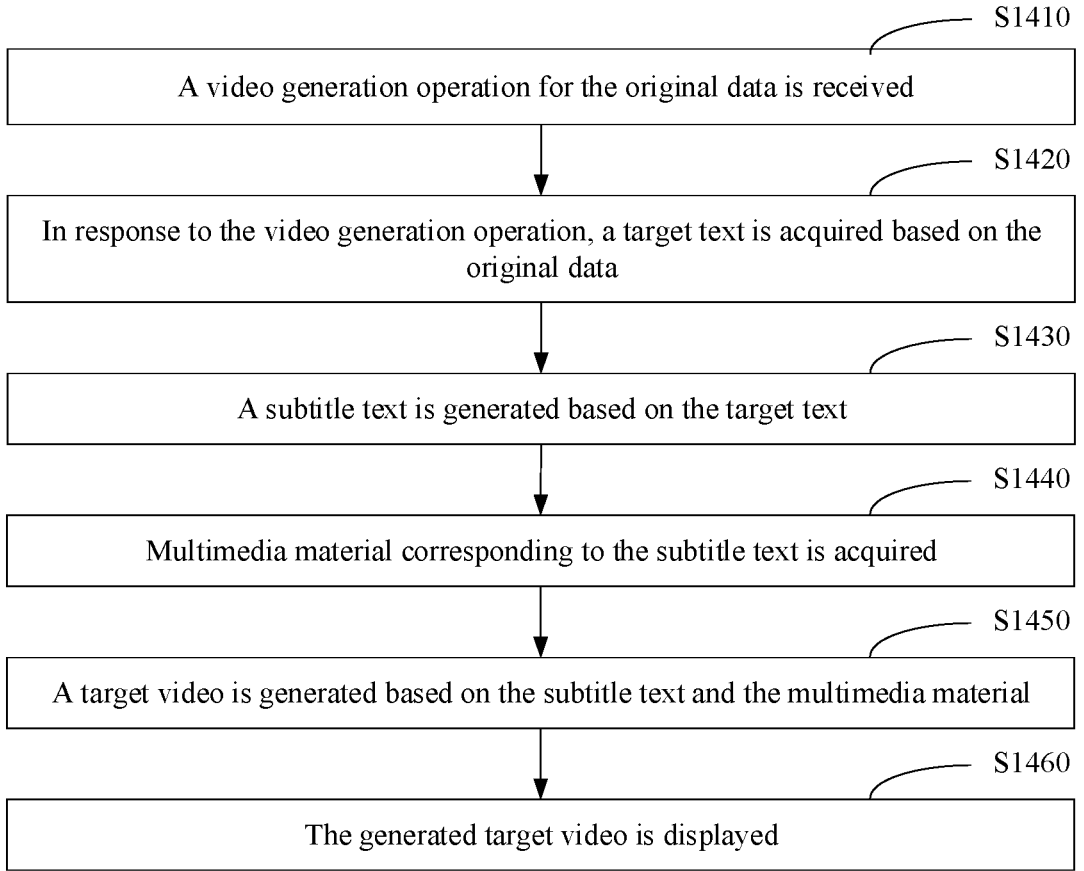

S1410
A video generation operation for the original data is received

S1420
In response to the video generation operation, a target text is acquired based on the original data S1430
A subtitle text is generated based on the target text S1440
Multimedia material corresponding to the subtitle text is acquired S1450
A target video is generated based on the subtitle text and the multimedia material S1460
The generated target video is displayed

Figure 14

Electronic device                                        Server

S1710、 Receive original data

S1720、 Display the original data

S1730、 Receive a video generation operation

S1740、 Send a video generation request

S1750、 Generate a target video

S1760、 Send the target video

S1770、 Display the target video

Video display apparatus1800

First receiving unit1810

First display unit1820

2000

1

VIDEO DISPLAY METHOD AND APPARATUS, VIDEO PROCESSING METHOD, APPARATUS, AND SYSTEM, DEVICE, AND MEDIUM

The present application is a national stage of International Application No. PCT/CN2021/130581, filed on Nov. 15, 2021, which claims priority to Chinese Patent Application No. 202011437788.4, titled "VIDEO DISPLAY METHOD AND APPARATUS, VIDEO PROCESSING METHOD, APPARATUS, AND SYSTEM, DEVICE, AND MEDIUM", filed on Dec. 7, 2020 with the State Intellectual Property Office of People's Republic of China, both of which are incorporated herein by reference in their entireties.

FIELD

The present disclosure relates to the field of multimedia technology, and in particular to a video display and processing method, apparatus and system, a device, and a medium.

BACKGROUND

With the rapid development of computer technology and mobile communication technology, various video platforms based on the electronic device have been widely used, greatly enriching the daily life of individuals. More users enjoy sharing their video works on video platforms for other users to watch.

In the conventional technologies, when making a video, the users first have to find materials by themselves, and then perform a series of complex video editing operations on the materials to finally generate a video work. If the materials found by the user are not rich enough, the quality of the video manually edited by the user cannot be guaranteed. Thus, the manual editing operation steps are complicated and time-consuming, which ends up with a relatively high cost of time for making the video.

SUMMARY

In order to solve all or at least partly of the above technical problems, a video display and processing method, apparatus and system, a device and a medium are provided according to the present disclosure, which can reduce the time cost of making videos.

In a first aspect, a video display method is provided according to the present disclosure. The video display method includes:

receiving a video generation operation for original data, where the original data is used to acquire a target text, and the video generation operation is used to trigger a generation of a target video corresponding to the target text; and displaying, in response to the video generation operation, a generated target video, wherein video elements of the target video include a subtitle text and a multimedia material corresponding to the subtitle text, the subtitle text is generated based on the target text, and the multimedia material is acquired based on the subtitle text.

In a second aspect, a video processing method is provided according to the present disclosure. The video processing method includes:

receiving a video generation request carrying original data from an electronic device;

acquiring a target text based on the original data, in response to the video generation request;

generating a subtitle text based on the target text;

acquiring a multimedia material corresponding to the subtitle text;

generating a target video, based on the subtitle text and the multimedia material; and sending the target video to the electronic device.

In a third aspect, a video display apparatus is provided according to the present disclosure. The video display apparatus includes: a first receiving unit and a first display unit.

The first receiving unit is configured to receive a video generation operation for original data, where the original data is used to acquire a target text, and the video generation operation is used to trigger a generation of a target video corresponding to the target text.

The first display unit is configured to display a generated target video in response to the video generation operation, wherein video elements of the target video comprise a subtitle text and a multimedia material corresponding to the subtitle text, the subtitle text is generated based on the target text, and the multimedia material is acquired based on the subtitle text.

In a fourth aspect, a video processing apparatus is provided according to the present disclosure. The video processing apparatus includes: a second receiving unit, a first acquiring unit, a first generating unit, a second acquiring unit, a second generating unit and a first sending unit.

The second receiving unit is configured to receive a video generation request carrying original data from an electronic device.

The first acquiring unit is configured to acquire a target text based on the original data, in response to the video generation request.

The first generating unit is configured to generate a subtitle text based on the target text.

The second acquiring unit is configured to acquire a multimedia material corresponding to the subtitle text.

The second generating unit is configured to generate a target video, based on the subtitle text and the multimedia material.

The first sending unit is configured to send the target video to the electronic device.

In a fifth aspect, a video processing system is provided according to the present disclosure. The video processing system includes an electronic device and a server.

The electronic device is configured to receive a video generation operation for original data, where the original data is used to acquire a target text, and the video generation operation is used to trigger a generation of a target video corresponding to the target text; send a video generation request carrying original data to the server in response to the video generation operation; receive the target video from the server; and display the target video.

The server is configured to receive the video generation request from the electronic device; acquire the target text based on the original data in response to the video generation request; generate a subtitle text based on the target text; acquire a multimedia material corresponding to the subtitle text; generate the target video based on the subtitle text and the multimedia material; and send the target video to the electronic device.

In a sixth aspect, a computing device is provided according to the present disclosure. The computing device includes: a processor; and a memory configured to store executable instructions, where the processor is configured to read the executable instructions from the memory, and execute the executable instructions to implement the video display method in the first aspect or the video processing method in the second aspect.

In a seventh aspect, a computer readable store medium storing a computer program thereon is provided according to the present disclosure, wherein the computer program, when executed by a processor, causes the processor to implement the video display method in the first aspect or the video processing method in the second aspect.

In an eighth aspect, a computer program product is provided according to the present disclosure. The computer program product includes a computer program carried on a computer readable medium. The computer program, when executed by a processor, causes the processor to implement the video display method in the first aspect or the video processing method in the second aspect.

Compared with the conventional technology, the technical solutions provided by embodiments of the present disclosure have the following advantages.

With the video display and processing method, apparatus and system, a device, and a medium according to the embodiments of the present disclosure, the video generation operation for the original data can be received. Since the original data can be used to acquire the target text, the video generation operation can be used to trigger the generation of the target video corresponding to the target text. Hence, after receiving the video generation operation, the target video generated in response to the video generation operation can be displayed. The video elements of the target video can include the subtitle text and multimedia material corresponding to the subtitle text. The subtitle text can be automatically generated based on the target text, and the multimedia material can be automatically acquired based on the subtitle text. Thus, enriched multimedia materials can be automatically found in the generation process of the target video, rather than finding the materials for video producing manually by the users. In this way, it can not only reduce the time cost of producing the video, but also improve the quality of the video produced.

BRIEF DESCRIPTION OF THE DRAWINGS

In conjunction with the drawings and with reference to the following embodiments, the above and other features, advantages and aspects of the embodiments of the present disclosure are more apparent. The same or similar reference numerals throughout the drawings represent the same or similar elements. It should be understood that the drawings are schematic and the components and elements are unnecessarily drawn to scale.

FIG. 11 is a schematic diagram of an original data input interface according to still another embodiment of the present disclosure;

FIG. 12 is a schematic diagram of an original data input interface according to still another embodiment of the present disclosure;

FIG. 14 is a schematic flowchart of a video display method according to another embodiment of the present disclosure;

DETAILED DESCRIPTION OF EMBODIMENTS

Figure 1:
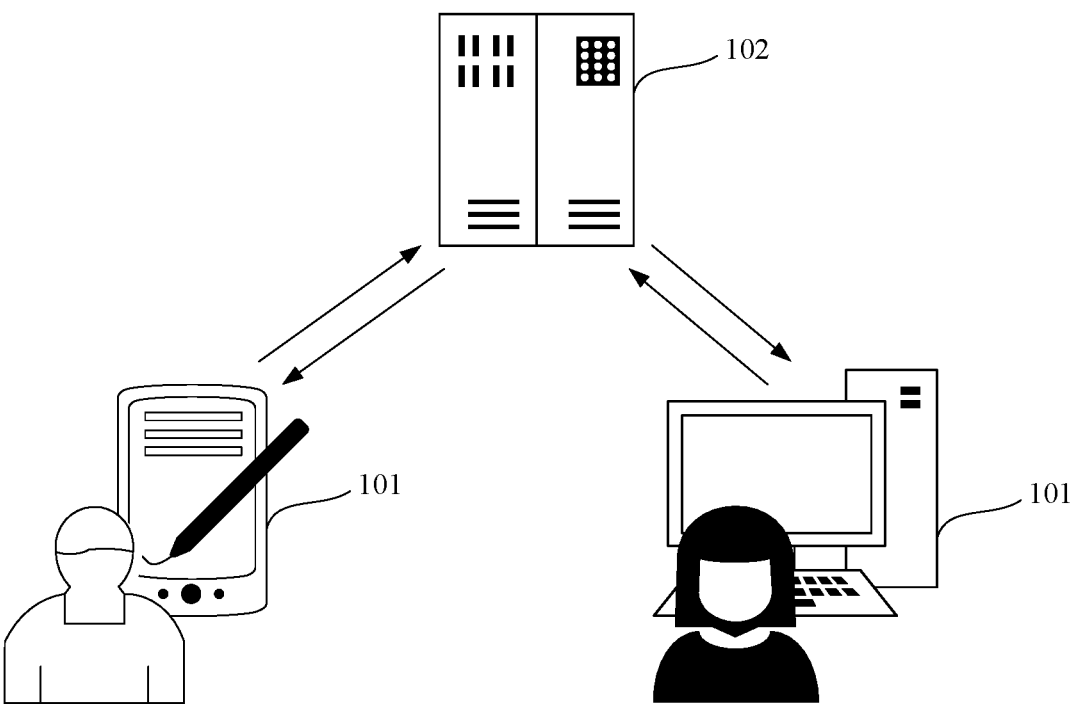
FIG. 1 is an architecture diagram of a video producing scenario according to an embodiment of the present disclosure.

The embodiments of the present disclosure are described in detail below with reference to the drawings. Although some embodiments of the present disclosure are shown in the drawings, it should be understood that the present disclosure may be implemented in various forms and should not be limited to the embodiments. Rather, the embodiments are provided for thoroughly and completely understanding the present disclosure. It should be understood that the drawings and the embodiments of the present disclosure are exemplary and are not intended to limit the protection scope of the present disclosure.

It should be understood that the steps in the method implementations of the present disclosure may be performed in different orders and/or in parallel. In addition, the method implementations may include an additional step and/or an omitted step that is not shown herein. The scope of the present disclosure is not limited in this aspect.

The term "include" and its variations in the present disclosure means open-ended inclusion, that is, "including but not limited to". The term "based on" means "based at least in part on". The term "one embodiment" means "at least one embodiment". The term "another embodiment" means "at least one additional embodiment". The term "some embodiments" means "at least some embodiments". The definitions of other terms are provided in the following descriptions.

It should be noted that concepts such as "first" and "second" mentioned in the present disclosure are only used to distinguish apparatuses, modules or units, are not intended to limit an sequential order or interdependence of the functions performed by the apparatuses, modules or units.

It should be noted that the modifications such as "one" and "multiple" mentioned in the present disclosure are illustrative and not restrictive. Those skilled in the art should understand that the modifications should be understood as "one or more" unless otherwise expressly indicated in the context.

The names of messages or information exchanged between multiple apparatuses in the embodiments of the present disclosure are only for illustrative purposes, and are not intended to limit the scope of the messages or information.

A video display method and a video processing method are provided according to the present disclosure, which can be applied to the architecture shown in FIG. 1 and will be described in detail with reference to FIG. 1.

FIG. 1 illustrates an architecture diagram of a video producing scenario according to an embodiment of the present disclosure.

As shown in FIG. 1, the architecture diagram may include at least one electronic device 101 of the client side and at least one server 102 of the server side. The electronic device 101 can establish a connection and perform an information interaction with the server 102 through a network protocol such as Hyper Text Transfer Protocol over Secure Socket Layer (HTTPS). The electronic device 101 may include devices with communication functions such as mobile phones, tablet computers, desktop computers, laptops, vehicle terminals, wearable devices, all-in-one machines, smart home devices, and may also include devices simulated by virtual machines or simulators. The server 102 may include a device with storage and computing functions, such as, a cloud server or a server cluster.

Based on the above architecture, the user can produce a video on a specified platform in the electronic device 101. The specified platform may be a specified application program or a specified website. After producing the video, the user can send the video to the server 102 of the specified platform. The server 102 can receive the video from the electronic device 101 and store the received video, so as to send the video to the electronic device that needs to play the video.

In an embodiment of the present disclosure, in order to reduce the time cost of producing a video and improve the quality of the produced video, the electronic device 101 can receive a video generation operation for the original data by the user. Since the original data can be used to acquire the target text, the video generation operation can be used to trigger a generation of a target video corresponding to the target text. Hence, after the electronic device 101 receives the video generation operation, the target video generated can be displayed in response to the video generation operation. The video elements of the target video can include a subtitle text and a multimedia material corresponding to the subtitle text. The subtitle text can be generated automatically based on the target text, and the multimedia material can be acquired automatically based on the subtitle text. Thus, enriched multimedia materials can be automatically found in the generation process of the target video, rather than finding the materials of the video producing manually by the users. As a result, it can not only reduce the time cost of producing the video, but also improve the quality of the video produced.

In a possible implementation, based on the above architecture, after receiving the video generation operation, the electronic device 101 may acquire the target text based on the original data, and generate a subtitle text based on the target text, and then acquire the multimedia material corresponding to the subtitle text, so as to generate the target video based on the subtitle text and the multimedia material. The electronic device 101 can locally acquire the target text based on the original data and generates the target video corresponding to the target text, thereby further reducing the time cost of producing the video.

In a possible implementation, based on the above architecture, the electronic device 101 can further send a video generation request carrying original data to the server 102, after receiving the video generation operation. After receiving the video generation request carrying the original data from the electronic device 101, the server 102 can acquire the target text based on the original data in response to the video generation request; generate the subtitle text based on the target text; acquire the multimedia material corresponding to the subtitle text, and then generate the target video based on the subtitle text and the multimedia material. The server 102 sends the generated target video to the electronic device 101. In this way, the electronic device 101 can request the server 102 to acquire the target text based on the original data and generate the target video corresponding to the target text, to further improve the quality of the produced video and reduce the data processing workload of the electronic device 101.

Based on the above architecture, the video display method according to the embodiment of the present disclosure will be described below with reference to FIG. 2 to FIG. 15. In an embodiment of the present disclosure, the video display method may be executed by an electronic device, such as the electronic device 101 in the client side shown in FIG. 1. The electronic device may include a device with a communication function such as mobile phones, tablet computers, desktop computers, laptops, vehicle terminals, wearable devices, all-in-one computers, and smart home devices, as well as a device simulated by a virtual machine or a simulator.

Figure 2:
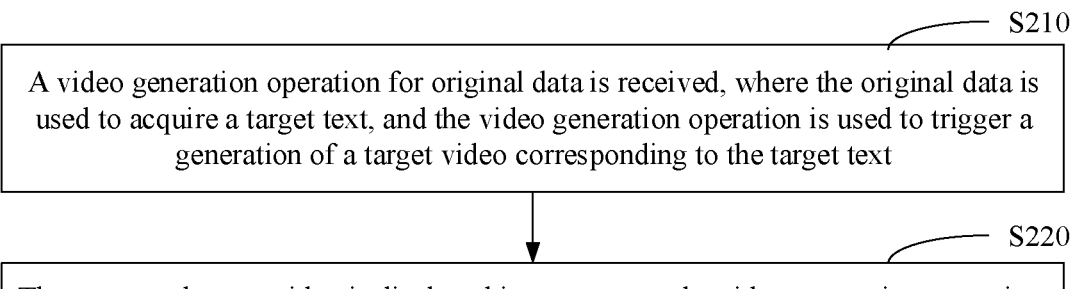
FIG. 2 is a schematic flowchart of a video display method according to an embodiment of the present disclosure.

FIG. 2 illustrates a schematic flowchart of a video display method according to an embodiment of the present disclosure.

As shown in FIG. 2, the video display method may include the following steps S210-S220.

In S210, a video generation operation for original data is received, where the original data is used to acquire a target text, and the video generation operation is used to trigger a generation of a target video corresponding to the target text.

In an embodiment of the present disclosure, the target text may be whole text content involved in the original data. The original data may be data inputted by the user, or data sent from other devices to the electronic device.

In some embodiments of the present disclosure, in the case that the original data is inputted by the user, before the step S210, the video display method may further include:

receiving a data input operation of the user, wherein the data input operation is used to input the original data; and displaying the original data inputted by the user in real time, in response to the data input operation.

In a possible implementation, the user input operation may include an operation of adding original data, and may also include an operation of entering original data, which will not be limited herein.

As an example, the user can trigger a data input operation on the electronic device, to input the original data into the electronic device. After receiving the data input operation, the electronic device can respond to the data input operation and display the original data inputted by the user in real time.

In some embodiments, original data can include a character. In a possible implementation, the electronic device can display a first input box for entering the character. The user may perform an input operation for entering the character into the electronic device in a first input box. The electronic device can display the character inputted by the user in the first input box. For example, the first input box can be used to input the characters such as an article title and article content, and the user can enter the article title and article content in the first input box.

Figure 3:
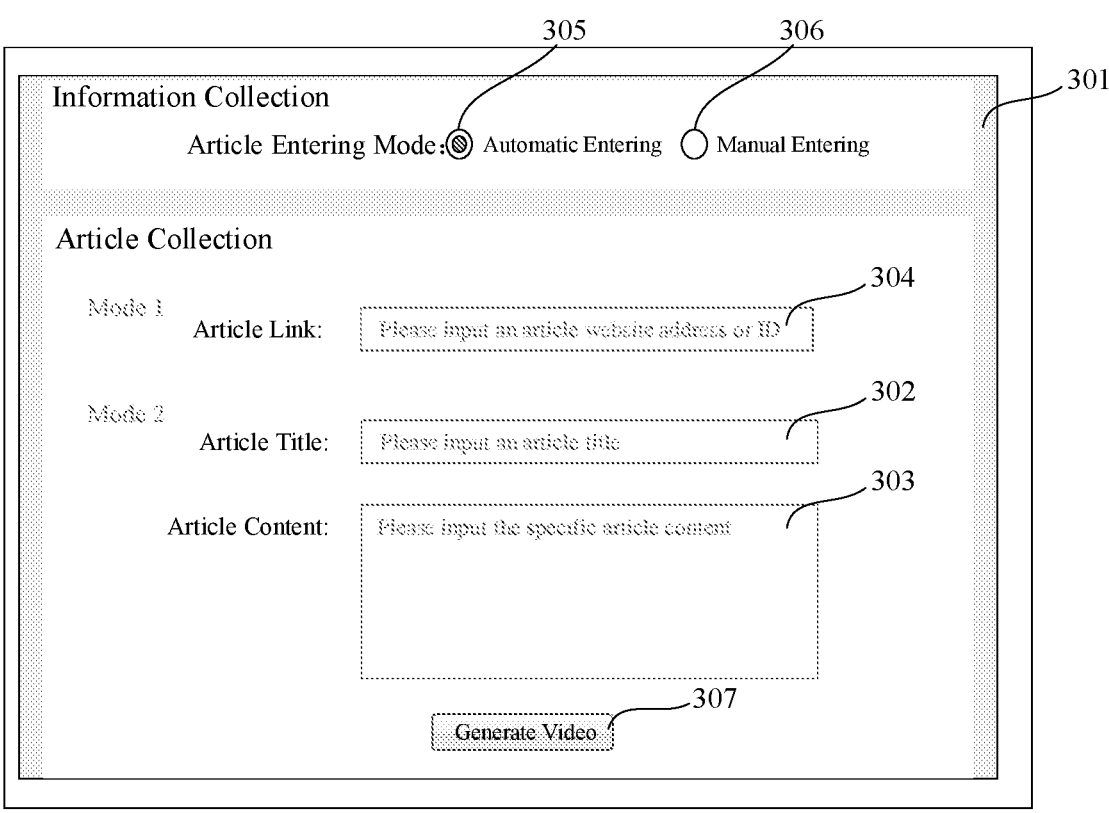
FIG. 3 is a schematic diagram of an original data input interface according to an embodiment of the present disclosure.

FIG. 3 illustrates a schematic diagram of an original data input interface according to an embodiment of the present disclosure. As shown in FIG. 3, multiple first input boxes may be displayed in the original data input interface 301, such as, an "Article Title" input box 302 and an "Article Content" input box 303. The user can perform an entering operation in the "Article Title" input box 302 to enter the article title, and can also perform an entering operation in the "Article Content" input box 303 to enter the article content.

Figure 4:
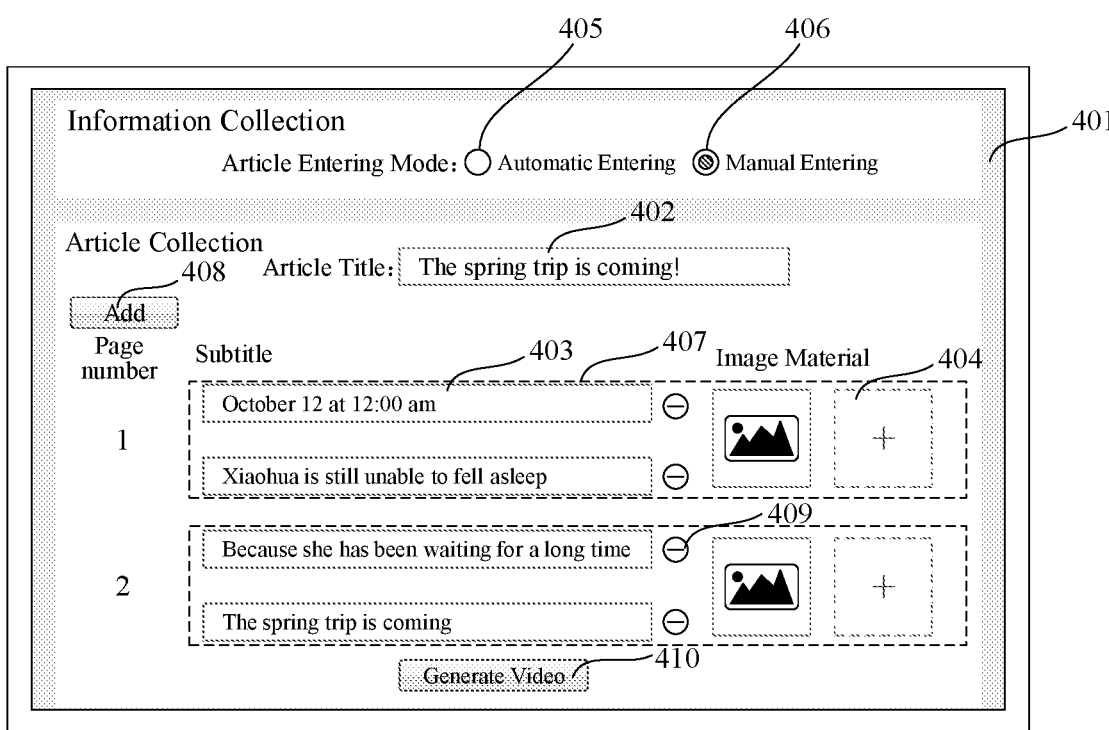
FIG. 4 is a schematic diagram of an original data input interface according to another embodiment of the present disclosure.

FIG. 4 illustrates a schematic diagram of an original data input interface according to another embodiment of the present disclosure. As shown in FIG. 4, multiple first input boxes may be displayed in the original data input interface 401, such as an "Article Title" input box 402 and a "Subtitle" input box 403. The user can perform an entering operation in the "Article Title" input box 402 to enter the article title, and can also perform an entering operation in the "Subtitle" input box 403 to enter the subtitle to be displayed in the video.

Figure 5:
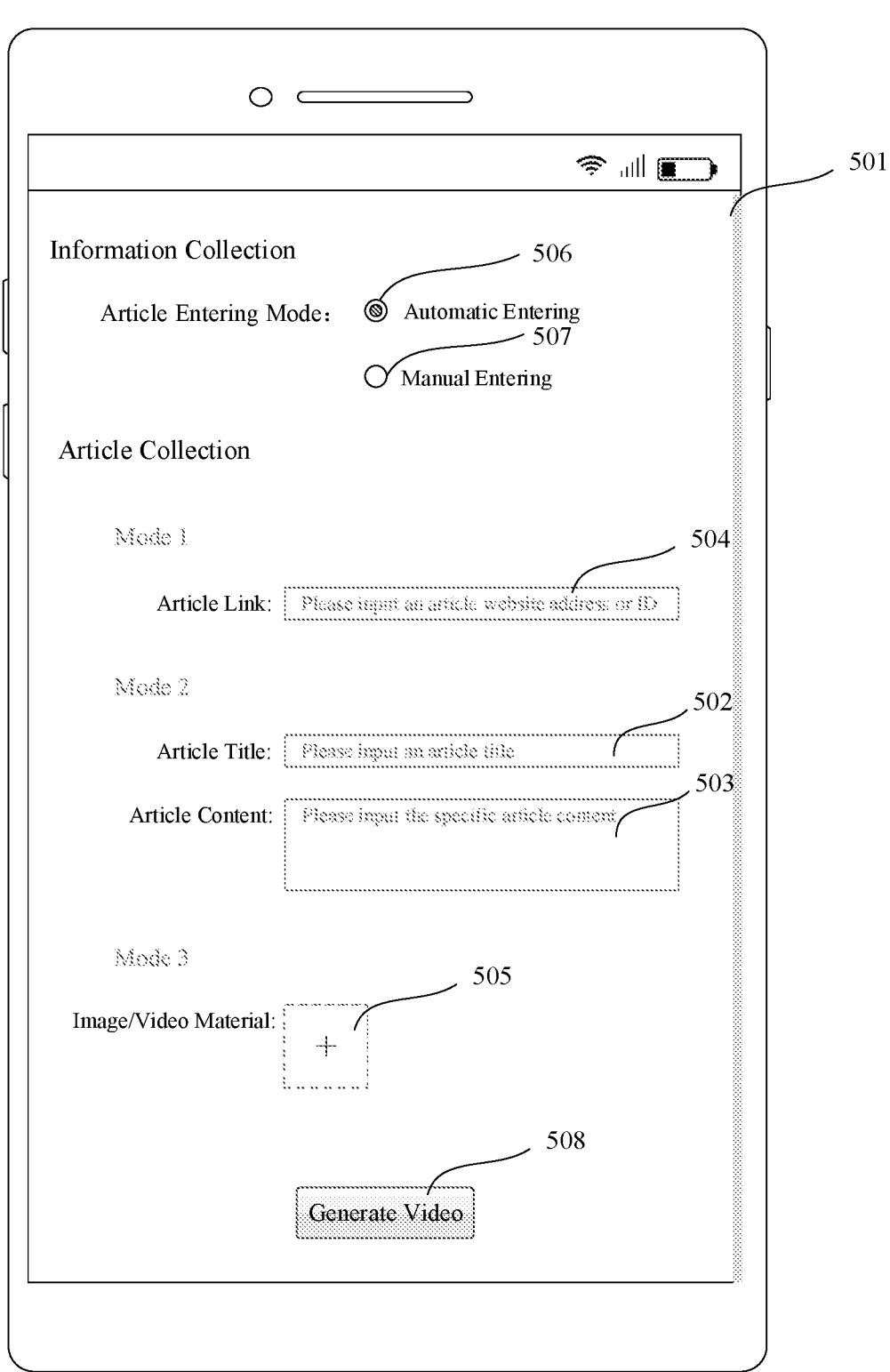
FIG. 5 is a schematic diagram of an original data input interface according to yet another embodiment of the present disclosure.

FIG. 5 illustrates a schematic diagram of an original data input interface according to another embodiment of the present disclosure. As shown in FIG. 5, multiple first input boxes may be displayed in the original data input interface 501, such as an "Article Title" input box 502 and an "Article Content" input box 503. The user can perform an entering operation in the "Article Title" input box 502 to enter the article title, and can also perform an entering operation in the "Article Content" input box 503 to enter the article content.

Hence, in the above embodiments, the target text can be acquired through the character in the original data.

In some other embodiments, the original data may also include a link address. The link address may be used to acquire the article content. In a possible implementation, the electronic device can display a second input box for entering the link address. The user can perform an entering operation for entering the link address to the electronic device in the second input box, so that the electronic device can display the link address inputted by the user in the second input box. For example, the second input box may be used to input a link address such as the website address (i.e., an URL) or Identity Document (ID) of the article. The user can input the website address or Identity Document (ID) of the article in the second input box.

It should be noted that the link address can be a character string in any form such as website address or ID, as long as the character string can be used to acquire the article content required by the user, which is not limited here.

Further referring to FIG. 3, a second input box, e.g., an "Article Link" input box 304, can be displayed in the original data input interface 301. The user can perform an entering operation in the "Article Link" input box 304 to enter the website address or ID of the article.

Further referring to FIG. 5, a second input box, e.g., an "Article Link" input box 504 can be displayed in the original data input interface 501. The user can perform an entering operation in the "Article Link" input box 504 to enter the website address or ID of the article.

Hence, in the above embodiments, the target text can be acquired, through the article content acquired based on the link address in the original data.

In some other embodiments, the original data may also include a link address, and the link address may further be used to acquire video content.

It should be noted that the method for the user entering the link address for acquiring the video content is similar to the above method for entering the link address for acquiring the article content, which will not be repeated herein.

Therefore, in these embodiments, the video content acquired based on the link address in the original data can be used to acquire the target text.

In still other embodiments, the original data may include a multimedia file. In a possible implementation, the multimedia file may include at least one of an image file, an audio file, and a video file. The electronic device can display an addition control for adding the multimedia file. The user can perform an addition operation for adding the multimedia file to the electronic device through the addition button, so that the electronic device can display the multimedia file added by the user. For example, the addition control can be an addition button. The addition operation can include a trigger operation such as clicking, long pressing, and double-clicking on the addition button; a selection operation such as clicking, long pressing, and selecting on the multimedia file; and other trigger operations such as clicking, long pressing, double-clicking on the selection confirmation button. The user can click the addition button to enter the multimedia file selection interface, browse the multimedia file in the multimedia file selection interface, click the desired multimedia file, and finally click the selection confirmation button to complete the addition operation of the multimedia file.

Further referring to FIG. 4, multiple addition controls, such as an "Image Material" addition control 404, can be displayed in the original data input interface 401. The user can perform an addition operation through the "Image Material" addition control 404 to add an image file.

Further referring to FIG. 5, an addition control, such as an "Image/Video Material" addition control 505, can be displayed in the original data input interface 501. The user can perform an addition operation through the "Image/Video Material" addition control 505 to add an image files or video file.

In one example, taking the user adding a video file through the "Image/Video Material" addition control 505 as an example, the video file may include a video file shot by the user in real time, a video file specified by the user from video files stored locally on the electronic device, a video file generated based on the embodiments of the present disclosure, and a video file obtained by editing the video files generated based on the embodiments of the present disclosure, thereby further performing optimized editing on the video file.

Therefore, in the above embodiments, the target text can be acquired through the multimedia file in the original data.

In other embodiments of the present disclosure, before receiving the data input operation of the user, the video display method may further include: receiving a mode selection operation of the user, where the mode selection operation is used for the user to select an input mode; and displaying an original data input interface corresponding to the selected input mode in response to the mode selection operation.

Correspondingly, the receiving the data input operation of the user can specifically include: receiving the data input operation which corresponds to the selected input mode and is inputted by the user, in the displayed original data input interface.

In a possible implementation, the input mode may include an automatic entering input mode and a manual entering input mode. In the automatic entering input mode, the user can input the above original data, so that the target text can be acquired through the original data. In the manual entering input mode, the user can directly input the multimedia material and a subtitle text which are used to generate the target video.

In some embodiments, the mode selection operation may include gesture operations inputted by the user to trigger enabling different input modes. As an example, the electronic device may be preset with multiple input modes and multiple gesture operations. One gesture operation may be used to trigger enabling a corresponding input mode. The user may determine the input mode to be selected, and input to the electronic device the gesture operation corresponding to the input mode to be selected. In this way, the electronic device enables the input mode corresponding to the received gesture operation after receiving the gesture operation inputted by the user, and displays the original data input interface corresponding to the enabled input mode. A control which is used for inputting original data and is supported by the enabled input mode can be displayed on this original data input interface. The user can input the data input operation corresponding to the control through the displayed control.

In some other embodiments, the mode selection operation may include selection operations of the user on selection controls for different input modes, e.g., operations such as clicking, long-pressing, and double-clicking on the selection controls. As an example, the electronic device can display multiple selection controls, and one selection control may correspond to one input mode. The user can determine the input mode to be selected, and input a selection operation to the selection control corresponding to the input mode to be selected. In this way, after receiving the selection operation inputted by the user, the electronic device may display the selection control selected by the selection operation in a selected state, enable the input mode corresponding to the selection control in the selected state simultaneously, and display an original data input interface corresponding to the enabled input mode. A control which is used for inputting original data and is supported by the enabled input mode may be displayed on this original data input interface, and the user may input a data input operation corresponding to the control through the displayed control.

Further referring to FIG. 3, multiple selection controls, such as an "Automatic Entering" selection control 305 and a "Manual Entering" selection control 306, may be displayed in the original data input interface 301. In the case that the user inputs a selection operation on the "Automatic Entering" selection control 305, the controls corresponding to the automatic entering input mode, such as the "Article Title" input box 302 and the "Article Content" input box 303 and "Article Link" input box 304, may be displayed in the original data input interface 301.

Further referring to FIG. 4, multiple selection controls, such as an "Automatic Entering" selection control 405 and a "Manual Entering" selection control 406, may be displayed in the original data input interface 401. In the case that the user inputs a selection operation to the "Manual Entering" selection control 406, the controls corresponding to the manual entering input mode, such as the "Article Title" input box 402, the "Subtitle" input box 403 and the "Image Material" addition control 405, may be displayed in the original data input interface 401.

As a result, the user can manually input the article title in the "Article Title" input box 402, and input subtitle text in the "Subtitle" input box 403.

One page may correspond to one "Image Material" addition control 404, and one "Image Material" addition control 404 may correspond to at least one "Subtitle" input box 403. As an example, a page editing area 407 can be set for the page corresponding to each page number. At least one "Subtitle" input box 403 and an "Image Material" addition control 404 of the page can be located in the page editing area 407 of the page. For example, for the page number "1", a page editing area 407 may be set at the right side of the page number. The user may manually input the subtitle text through the "Subtitle" input box 403 and input the image through the "Image Material" addition control 404 in the page editing area 407, both of which are the subtitle text and image for page 1. A display order of the subtitle text and image on page 1 corresponds to a setting order of the corresponding "Subtitle" input box 403 and "Image Material" addition control 405.

In a possible implementation, in the manual entering input mode, the original data input interface 401 can further display a material addition control, such as a "New Addition" button 408. The user can add a "Subtitle" input box 403 and an "Image Material" addition control 404 corresponding to a new page through the "New Addition" button 408, or add a "Subtitle" input box 403 in the displayed page.

In a possible implementation, in the manual entering input mode, the original data input interface 401 may further display a subtitle deletion control, such as a "-" button 409. One "-" button 409 corresponds to one "Subtitle" input box 403. The user can delete the corresponding "Subtitle" input box 403 through the "-" button 409.

Thus, the user can sequentially enter the title of the article, the subtitle of each clause, and the image material corresponding to each subtitle, in the manual entering input mode.

Further refer to FIG. 5, multiple selection controls, such as an "Automatic Entering" selection control 506 and a "Manual Entering" selection control 507, may be displayed in the original data input interface 501. In the case that the user inputs a selection operation to the "Automatic Entering" selection control 506, controls corresponding to the automatic enter input mode, such as the "Article Title" input box 502, the "Article Content" input box 503, "Article Link" input box 504, and "image/video material" addition control 505, may be displayed in the original data input interface 501.

It should be noted that, in the case that the user inputs a selection operation to "Manual Entering" selection control 507, the controls which correspond to the manual entering input mode and are displayed in the original data input interface 501 are similar to those shown in FIG. 3, which will not be repeated herein.

In still some embodiments of the present disclosure, in the case that the original data is sent by other devices to the electronic device, before S210, the video display method may further include: receiving and displaying the original data.

In a possible implementation, the original data may include at least one of a character, a link address, and a multimedia file, which will not be repeated herein.

Thus, in the embodiments of the present disclosure, the electronic device can provide a user with a variety of input modes of original data such that the user can select the input mode according to needs, further improving the user experience.

Returning back to S210, the user may input a video generation operation for the original data to the electronic device, so as to trigger the generation and display of the target video corresponding to the target text.

In an embodiment, the video generation operation may be a trigger operation such as long pressing, double clicking, voice control, or expression control on the original data. Alternatively, the video generation operation may also be a trigger operation such as clicking, long pressing, or double clicking on the video generation trigger control.

Further referring to FIG. 3, a video generation trigger control, such as a "Generate Video" button 307, can be displayed in the original data input interface 301. The user can input a trigger operation to the "Generate Video" button 307 to trigger the generation and display of the target video corresponding to the target text involved in the original data.

Further referring to FIG. 4, a video generation trigger control, such as a "Generate Video" button 410, can be displayed in the original data input interface 401. The user can input a trigger operation on the "Generate Video" button 410 to trigger the generation and display of the target video corresponding to the target text involved in the original data.

Further referring to FIG. 5, a video generation trigger control, such as a "Generate Video" button 508, can be displayed in the original data input interface 501. The user can input a trigger operation to the "Generate Video" button 508 to trigger the generation and display of the target video corresponding to the target text involved in the original data.

In S220, the generated target video is displayed in response to the video generation operation, where a video element of the target video includes a subtitle text and a multimedia material corresponding to the subtitle text, the subtitle text is generated based on the target text, and the multimedia material is acquired based on the subtitle text.

In an embodiment, after receiving the video generation operation, the electronic device may display the target video generated based on the target text involved in the original data, in response to the video generation operation.

In a possible implementation, the electronic device may display the target video in a full screen or in the partial display area. In the case that the electronic device includes one display screen, the partial display area may be a part of a display area of the display screen. In the case that the electronic device includes two or more display screens, the partial display area may be a part of a display area of any display screen, or any one of the display screens.

Figure 6:
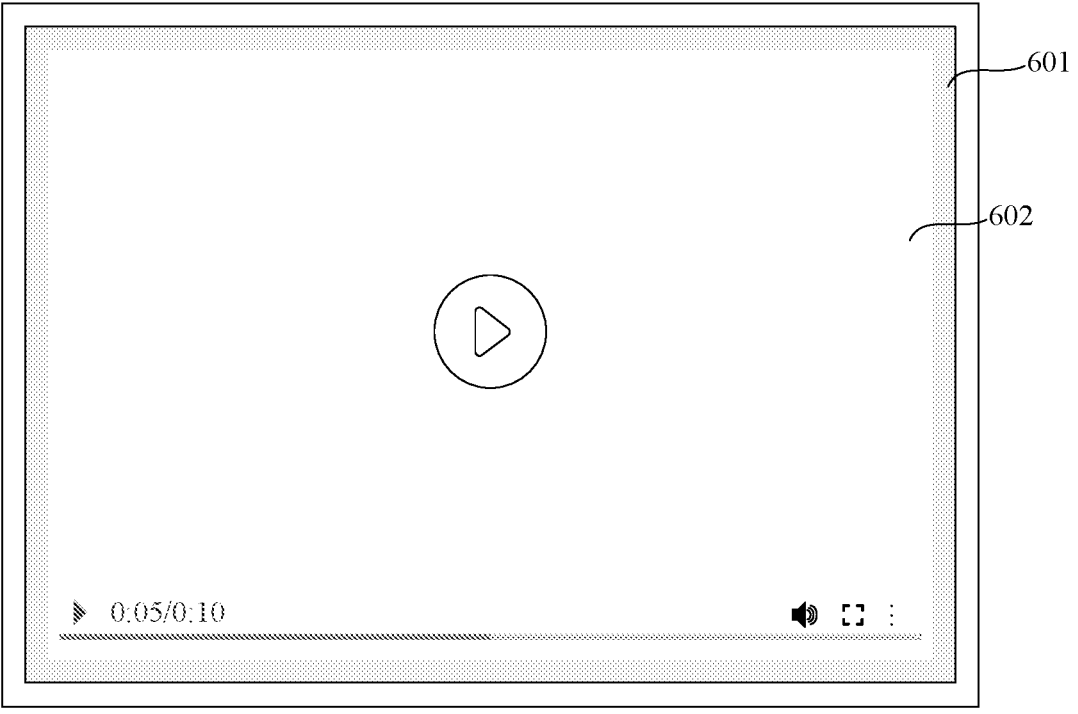
FIG. 6 is a schematic diagram of a video display interface according to an embodiment of the present disclosure.

FIG. 6 illustrates a schematic diagram of a video display interface according to an embodiment of the present disclosure. As shown in FIG. 6, after receiving the video generation operation, the electronic device may display a video display interface 601 in response to the video generation operation, and display a playback window 602 of the target video in the video display interface 601 in the full screen.

Figure 7:
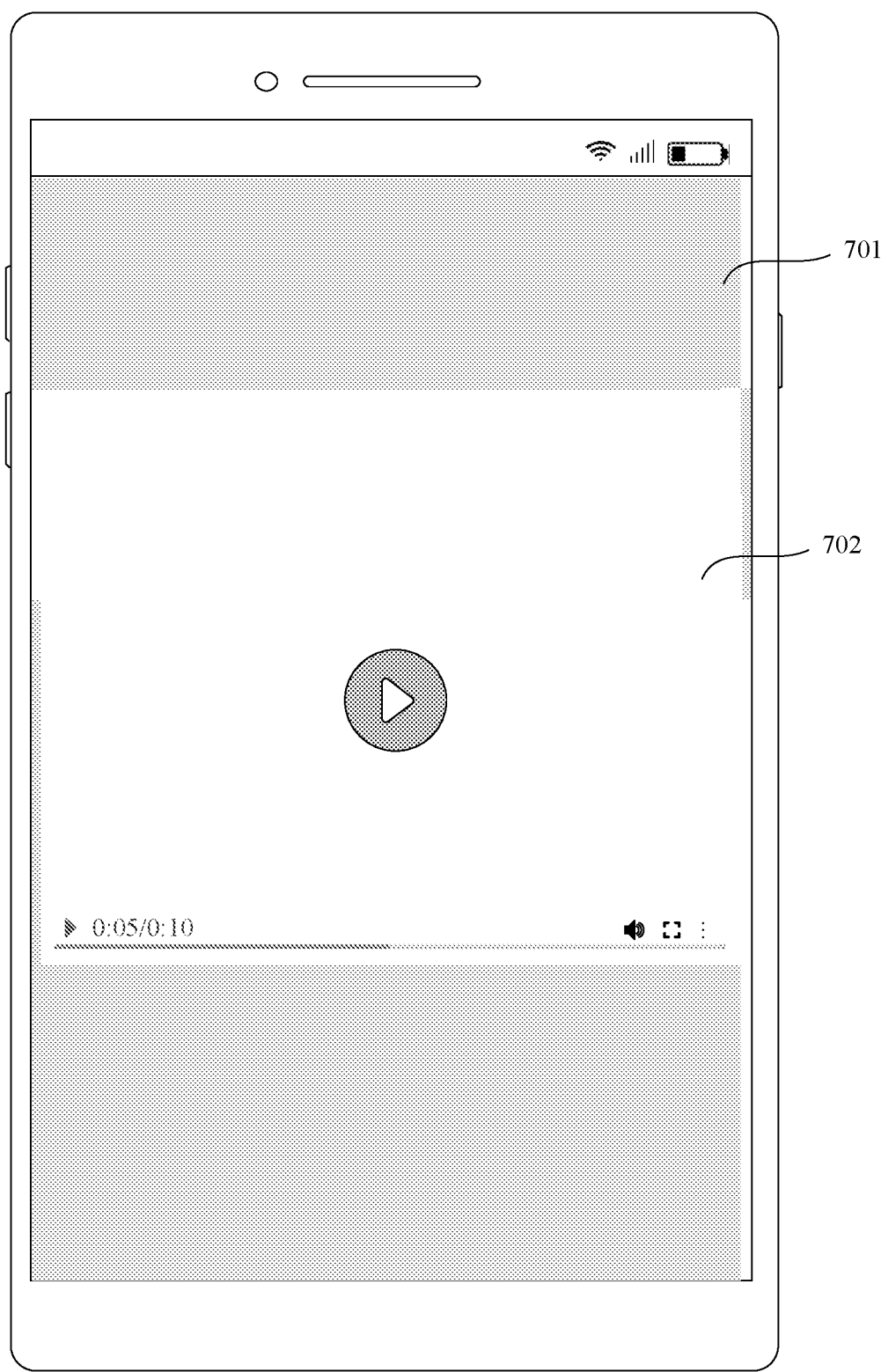
FIG. 7 is a schematic diagram of a video display interface according to another embodiment of the present disclosure.

FIG. 7 illustrates a schematic diagram of a video display interface according to another embodiment of the present disclosure. As shown in FIG. 7, after receiving the video generation operation, the electronic device may display a video display interface 701 in response to the video generating operation, and display a playback window 702 of the target video in the middle display area of the video display interface 701.

In an embodiment of the present disclosure, the video element of the target video may include at least one subtitle text. One subtitle text may correspond to at least one multimedia material. The multimedia material may include at least one of the image, the video, and the audio.

Further, the subtitle text can be automatically generated based on the target text acquired from the original data.

In some embodiments, the subtitle text may be generated by the electronic device. In some other embodiments, the subtitle text may also be generated by the server, which will be described in detail hereinafter. The server can be the server 102 in the server side shown in FIG. 1.

Further, the multimedia material can be automatically acquired from multiple local or Internet materials, based on the subtitle text.

In some embodiments, multimedia material may be acquired by the electronic device. In some other embodiments, the multimedia material may also be acquired by the server, which will be described in detail hereinafter.

In the embodiments of the present disclosure, the video generation operation for the original data may be received. Since the original data can be used to acquire the target text, the video generation operation can be used to trigger the generation of the target video corresponding to the target text. Hence, after receiving the video generation operation, the target video generated in response to the video generation operation may be displayed. The video element of the target video may include the subtitle text and the multimedia material corresponding to the subtitle text. The subtitle text can be automatically generated based on the target text, and the multimedia material can be automatically acquired based on the subtitle text. Thus, enriched multimedia materials can be automatically found in the generation process of the target video, rather than manually searching for materials for producing videos by the users. Thus, the time cost of producing videos can be reduced, and the quality of the produced videos can be improved.

In another implementation of the present disclosure, in order to further improve user experience, after S210, the video display method can further include:

displaying a video editing interface in response to the video generation operation, where the video editing interface includes an editable element, and the editable element includes at least one of a video element and a display effect element corresponding to the video element;

receiving an element modification operation on the editable element; and displaying a modified target video in response to the element modification operation, where the modified target video includes the editable element displayed in the video editing interface when the element modification operation is completed.

In an embodiment, after receiving the video generating operation, the electronic device may display a video editing interface for adjusting the target video in response to the video generating operation.

In a possible implementation, the user may adjust at least one of the video element of the target video and a display effect element corresponding to the video element, in the video editing interface. Therefore, at least one of the video element and the display effect element corresponding to the video element can be used as an editable element in an editable state in the video editing interface.

Further, the display effect element may include a transition effect element, play effects, special effects and a modification effect element. As an example, the modification effect element may include effect elements serving as a modification function for the video element, which can modify the tone, size, contrast, color, and modification text of the video element.

As a result, the user can input an element modification operation on the editable element to be adjusted, in the video editing interface. The electronic device can display the editable element adjusted by the user during the element modification operation in real time. In this way, after the user completes the element modification operation, the modified target video is displayed, where the modified target video is generated based on the editable elements displayed in the video editing interface when the user completes the element modification operation.

In a possible implementation, the element modification operation may include at least one of the following: an operation of modifying the subtitle text, an operation of adding the subtitle text, an operation of deleting the subtitle text, an operation of replacing the image material in the multimedia material, an operation of adding the image material in the multimedia material, an operation of deleting the image material in the multimedia material, an operation of replacing the video material in the multimedia material, an operation of adding the video material in the multimedia material, an operation of deleting the video material in the multimedia material, an operation of replacing the background audio in the multimedia material, an operation of deleting the background audio in the multimedia material, an operation of adjusting the modification effect of the subtitle text, an operation of modifying the transition effect of the subtitle text, an operation of adjusting the modification effect of the image material, an operation of modifying the transition effect of the image material, an operation of adjusting the modification effect of the video material, an operation of modifying the transition effect of the video material and the like, which will not be limited herein.

Further, a completion indication control may be displayed in the video editing interface. The user may input a completion trigger operation by clicking, long pressing, double clicking the completion indication control. When the user input the completion trigger operation by the completion indication control, the electronic device may determine that the user has completed the element modification operation, in response to a reception of the completion trigger operation of the user on the completion indication control. The electronic device may display the modified target video, where the modified target video is generated based on the editable elements in the video editing interface when the user completes the element modification operation.

In some embodiments of the present disclosure, the video editing interface and the target video may be displayed in the same interface. For example, a playback window of the target video is displayed in the video display interface, and a video editing interface is displayed below the playback window.

Figure 8:
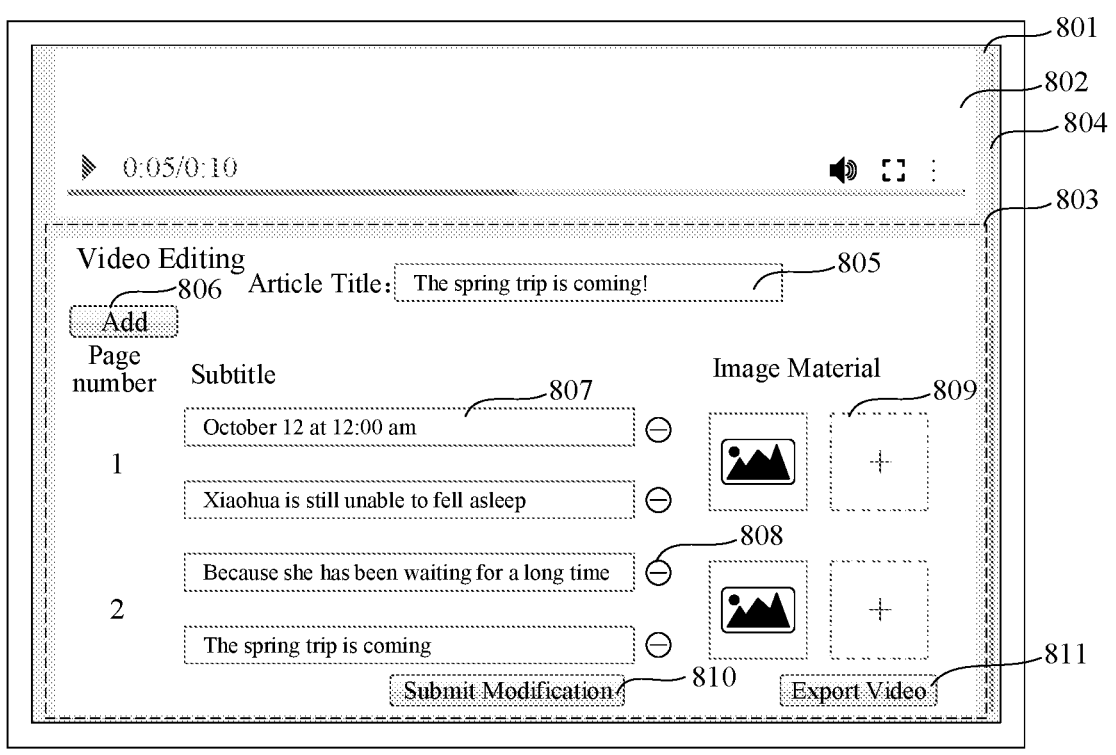
FIG. 8 is a schematic diagram of a video display interface according to yet another embodiment of the present disclosure.

FIG. 8 illustrates a schematic diagram of a video display interface according to yet another embodiment of the present disclosure. As shown in FIG. 8, after receiving the video generation operation, the electronic device may display a video display interface 801 in response to the video generation operation, and display a playback window 802 of the target video in the video display interface 801. A video editing interface 803 is displayed below the playback window 802.

In a possible implementation, a scrollbar 804 may be displayed on the right side of the video display interface 801, and the user may view the content of the video editing interface 803 by dragging the scrollbar 804.

In the video editing interface 803, the user can perform an element modification operation on the editable element such as the article title, subtitle text, and image material. For example, the article title may be modified through the "Article Title" input box 805. A subtitle text of a new page or the subtitle text of the displayed page may be added through the "New Addition" button 806. The subtitle text may be modified through the "Subtitle" input box 807. The subtitle file is deleted through the "-" button 808. The image material and video material are replaced and added through "Image Material" addition control 809.

In a possible implementation, a completion indication control, such as a "Submit Modification" button 810, may be displayed at the bottom of the video editing interface 803. The user can input a completion trigger operation on the "Submit Modification" button 810 to trigger the generation and display of the modified target video.

Figure 9:
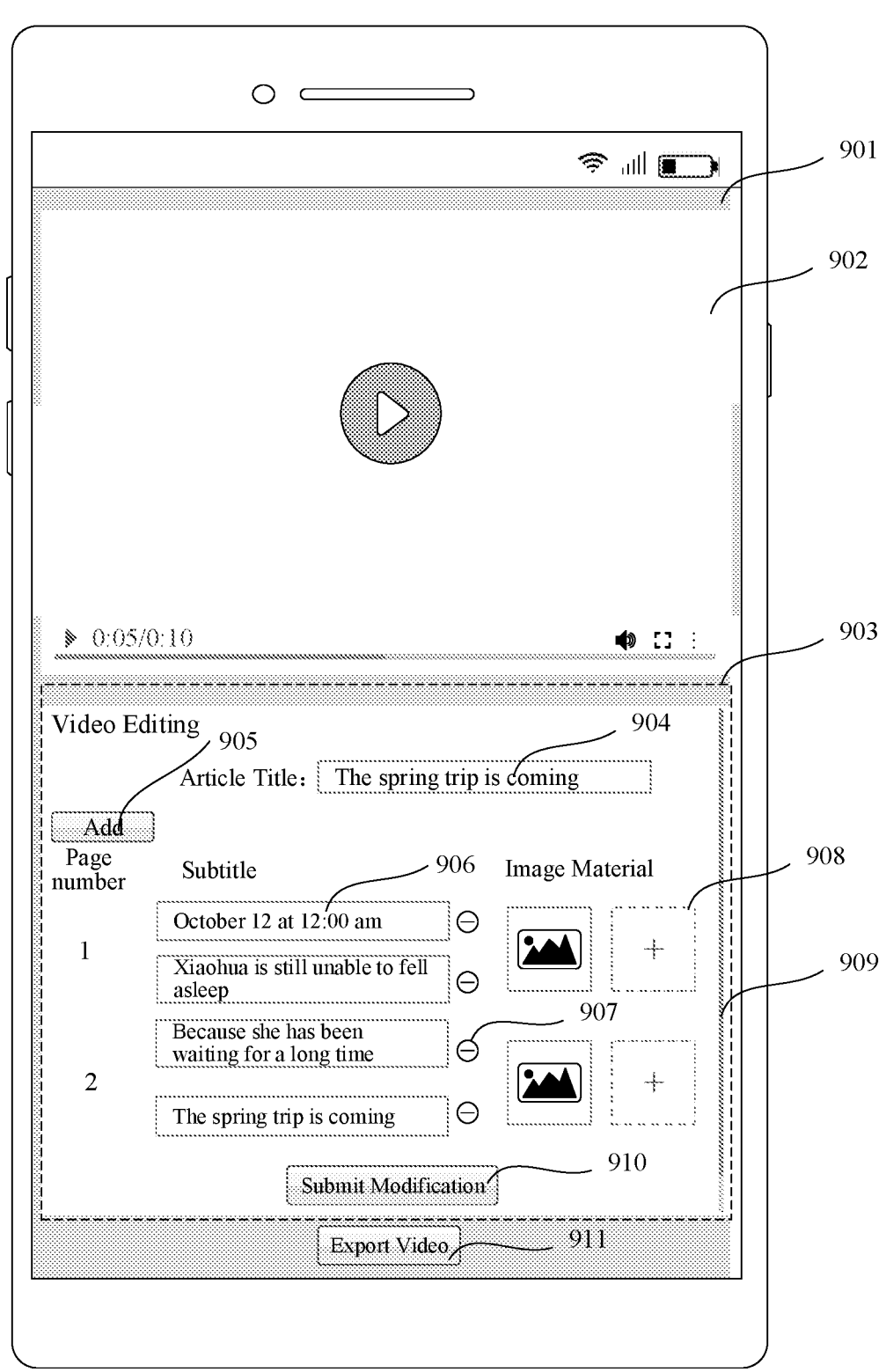
FIG. 9 is a schematic diagram of a video display interface according to still another embodiment of the present disclosure.

FIG. 9 illustrates a schematic diagram of a video display interface according to still another embodiment of the present disclosure. As shown in FIG. 9, after receiving the video generation operation, the electronic device can display a video display interface 901 in response to the video generation operation, and display a playback window 902 of the target video in the video display interface 901. In addition, a video editing interface 903 is displayed below the playback window 902.

In the video editing interface 903, the user can perform the element modification operation on the editable element such as the article title, subtitle text, and image material. For example, the article title is modified through the "Article Title" input box 904. A subtitle text of a new page or the subtitle text of the displayed page is added through the "New Addition" button 905. The subtitle text is modified through the "Subtitle" input box 906. The subtitle file is deleted through the "-" button 907. The image material and video material are replaced and added through "Image Material" addition control 908.

In a possible implementation, a scrollbar 909 can be displayed on the right side of the video editing interface 903. The user may view content which is not displayed in the video editing interface 903 by dragging the scroll bar 909.

In a possible implementation, the bottom of the video editing interface 903 can display a completion indication control, such as a "Submit Modification" button 910, and the user may input a completion trigger operation on the "Submit Modification" button 910 to trigger the generation and display of the modified target video.

Figure 10:
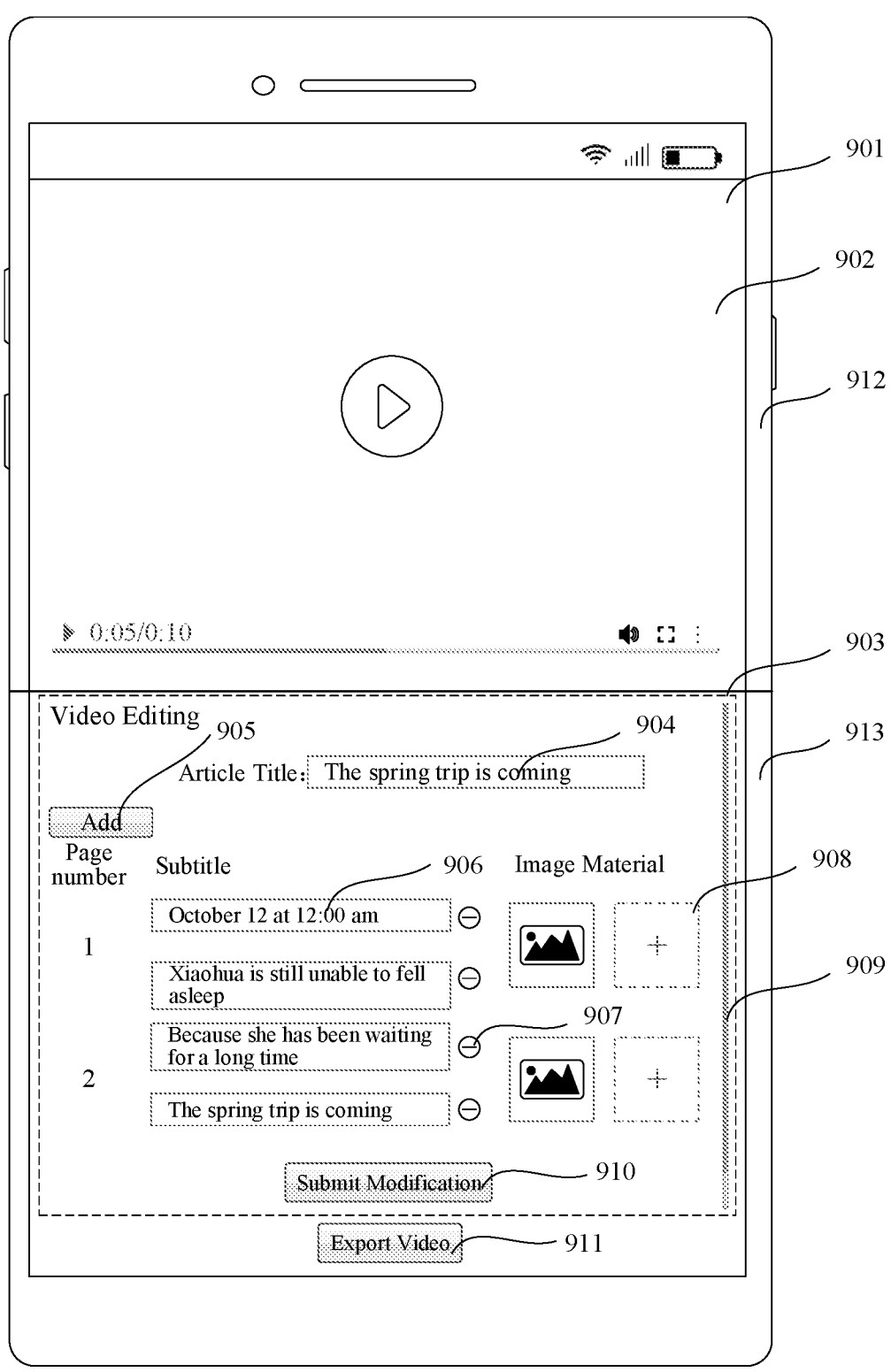
FIG. 10 is a schematic diagram of a video display interface according to still another embodiment of the present disclosure.

FIG. 10 illustrates a schematic diagram of a video display interface according to still another embodiment of the present disclosure. In the case that the electronic device has the first display screen 912 and the second display screen 913, after receiving the video generating operation, the electronic device may display the video display interface 901 in response to the video generating operation. A playback window 902 of the target video is displayed in the video display interface 901, and a video editing interface 903 is displayed below the playback window 902. The playback window 902 may be located in the first display screen 912, and the video editing interface 903 may be located in the second display screen 913.

It should be noted that the video editing interface 903 is similar to the embodiment shown in FIG. 9, which will not be repeated herein.

In a possible implementation, a video export control may further be displayed in the video display interface. If the user satisfies the video effect, the user can input an export trigger operation such as clicking, long pressing, or double-clicking on the video export control. In response to receiving the export trigger operation inputted on the video export control by the user, the electronic device saves the video displayed in the video display interface locally in the electronic device.

Referring back to FIG. 8, a video export control, such as an "Export Video" button 811, may be displayed at the bottom of the video editing interface 803. In a possible implementation, the "Export Video" button 811 can be located at the right side of the "Submit Modification" button 810. The user can input an export trigger operation on the "Export Video" button 810, so that the electronic device saves the video displayed in the video display interface 811 locally in the electronic device.

Referring back to FIGS. 9 and 10, a video export control, such as an "Export Video" button 911, may be displayed at the bottom of the video display interface 901. The user can input an export trigger operation on the "Export Video" button 911, so that the electronic device saves the video displayed in the video display interface 901 locally in the electronic device.

In this way, in the embodiments of the present disclosure, the user can view the video and related elements in the adjusted video on the same page, so as to improve the user experience.

In other embodiments of the present disclosure, the video editing interface may be displayed in a different interface from the target video. For example, the playback window of the target video and the modification trigger control, such as the "Video Modification" button, are displayed in the video display interface. The user can input a modification trigger operation such as clicking, long pressing, and double-clicking on the modification trigger control. The electronic device can jump from the display of the video display interface to the display of the video editing interface, in respond to receiving the modification trigger operation inputted on the modification trigger control by the user.

The video editing interface is the same as that of the above embodiment, which will not be repeated herein.

In a possible implementation, after determining that the user completes the element modification operation, the electronic device can jump from the display of the video editing interface to the display of the video display interface, so as to display the modified target video. The modified target is generated based on the editable element displayed in the video editing interface when the user completes the element modification operation.

In a possible implementation, a video export control may further be displayed in the video display interface. The user can input an export trigger operation such as clicking, long pressing, or double-clicking on the video export control. In response to receiving the export trigger operation inputted on the video export control by the user, the electronic device saves the video displayed in the video display interface locally in the electronic device.

Therefore, in the embodiments of the present disclosure, the independent display of the target video and the video editing interface can be realized, so as to improve the user experience.

In yet another implementation of the present disclosure, in order to further improve the user experience, after step S210 and before displaying the generated target video in step S220, the video display method can further include:

displaying an indication identifier, where the indication identifier indicates that the target video has been generated;

receiving an identifier trigger operation on the indication identifier; and hiding the original data in response to the identifier trigger operation.

As an example, after the target video is generated, the electronic device may not directly display the target video, but display an indication identifier for indicating that the target video has been generated. After seeing the indication identifier, the user can know that the production of the target video has been completed, and can input an indication trigger operation on the indication identifier to the electronic device, so as to trigger the display of the generated target video. After receiving the indication trigger operation on the indication identifier by the user, the electronic device can hide the currently displayed original data and display a video display interface in response to the identification trigger operation. The video display interface may display the target video.

In a possible implementation, the indication trigger operation may be trigger operations such as clicking, long pressing, or double-clicking on the indication identifier, which will not limited herein.

Detailed descriptions with an example will be described below.

Figure 13:
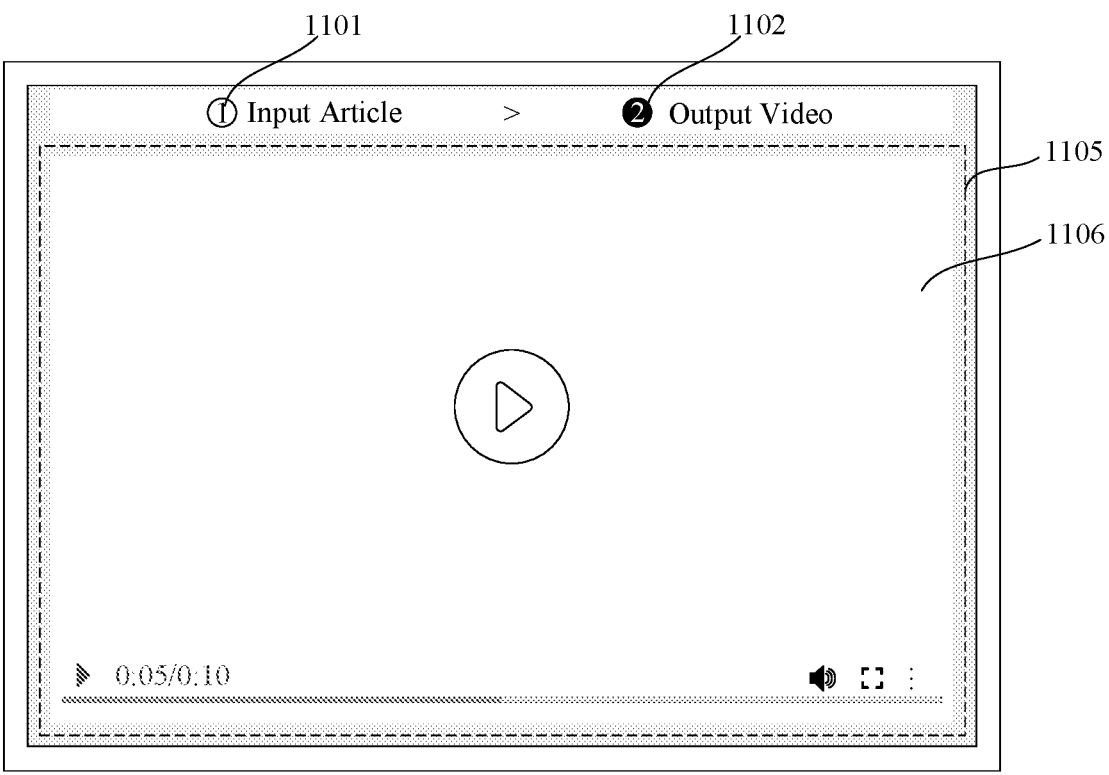
FIG. 13 is a schematic diagram of a video display interface according to yet another embodiment of the present disclosure.

FIG. 11 illustrates a schematic diagram of an original data input interface according to still another embodiment of the present disclosure. FIG. 12 illustrates a schematic diagram of an original data input interface according to still another embodiment of the present disclosure. FIG. 13 illustrates a schematic diagram of a video display interface according to yet another embodiment of the present disclosure.

Referring to FIG. 11, multiple page identifiers, such as an "Input Article" page identifier 1101 and an "Output Video" page identifier 1102, may be displayed at the top display area of the display screen of the electronic device. When the "Input Article" page identifier 1101 is displayed in a selected state, an original data input interface 1103 may be displayed below the top display area. The display content and interaction mode of the original data input interface 1103 are similar to those as shown in FIG. 3 and FIG. 4, which will not be repeated herein.

Referring to FIG. 12, after the user completes the input of the original data and inputs a trigger operation to the "Generate Video" button, the electronic device may wait for the generation of the target video. While the electronic device is waiting for the generation of the target video, the original data input interface 1103 can be displayed in a non-operational state, for example, be set in gray. After the electronic device determines that the target video has been generated, an indication identifier, such as a "☆" icon 1104, can be displayed behind the "Output video" page identifier 1102. The user can input an identifier trigger operation on the "☆" icon 1104 to make the electronic device display target video.

Referring to FIG. 13, when the electronic device receives the identifier trigger operation on the "*" icon 1104 by the user, the original data input interface 1103 can be hidden under the top display area. After the original data input interface 1103 is hidden, the video display interface 1105 is displayed below the top display area. A playback window 1106 of the target video may be displayed in the video display interface 1105.

In other embodiments of the present disclosure, while the electronic device is waiting for the generation of the target video, a progress prompt screen for indicating the production progress of the target video, for example, a progress prompt bar, may be displayed on the original data input interface 1103 in an overlapping manner, so that the user can be aware of the production progress of the target video.

In this way, it can prevent the user from erroneously modifying the original data while waiting for the generation of the target video, and prompt the user of, and the production progress of the target video, thereby further improving the user experience.

In yet another embodiment of the present disclosure, the electronic device can locally and automatically generate the subtitle text based on the target text acquired through original data, automatically acquire the multimedia material based on the subtitle text, and automatically generate the target video based on the subtitle text and multimedia material, so as to reduce the generation time of the target video.

In some embodiments of the present disclosure, when the user inputs original data to the electronic device in the automatic entering mode or the electronic device receives original data from other devices, the electronic device can locally and automatically generate the subtitle text based on the target text acquired through original data, automatically acquire the multimedia material based on the subtitle text, and automatically generate target video based on the subtitle text and multimedia material.

FIG. 14 illustrate a schematic flowchart of a video display method according to another embodiment of the present disclosure.

As shown in FIG. 14, the video display method may include the following steps S1410-S1460.

In S1410, a video generation operation for the original data is received.

The original data is used to acquire a target text, and the video generation operation is used to trigger a generation of a target video corresponding to the target text.

It should be noted that S1410 is similar to S210 in the embodiment as shown in FIG. 2, the details of which will not be repeated herein.

In S1420, in response to the video generation operation, a target text is acquired based on the original data.

In some embodiments, in the case that the original data includes a character, S1420 may further include: extracting the character in the original data; and using the character as the target text.

As an example, the electronic device can determine the data type of the original data in response to the video generation operation. In the case that the data type of the original data is determined as a type of character, it can directly extract the character in the original data and use the extracted character as the target text.

In a possible implementation, the electronic device can determine the data type of the original data through the control that receives the original data.

Referring back to FIG. 3, in response to receiving the trigger operation inputted by the user on the "Generate Video" button 307, the electronic device determines that the controls that receive the original data are the "Article Title"

input box 302 and the "Article Content" input box 303. In this case, the electronic device can determine that the data type of the original data is a type of character, and then directly extract the characters in the original data such as the text title and text content, and use the extracted characters as the target text.

In some other embodiments, in the case that the original data includes a multimedia file, S1420 can further include: performing a text conversion on the multimedia file to obtain a converted text; and using the converted text as the target text.

As an example, in response to the video generation operation, the electronic device can determine the data type of the original data. In the case that the data type of the original data is determined as a type of multimedia file, text conversion is performed on the multimedia file to obtain the converted text, and the converted text is used as the target text.

In a possible implementation, the electronic device can determine the data type of the original data through the control that receives the original data.

Referring back to FIG. 5, in response to receiving the trigger operation inputted by the user on the "Generate Video" button 508, it is determined that the control that received the original data is the "Image/Video Material" addition control 505. In this case, the electronic device may determine the data type of the original data is a type of file, perform text conversion on the multimedia file to acquire the converted text, and then use the converted text as the target text.

In a possible implementation, in the case that the multimedia file includes an image file, the text conversion can be performed on the image file through Optical Character Recognition (OCR) technology to obtain the converted text. Alternatively, content of the image screen of the image file can be learned, and the text conversion is performed by summarizing the content of the image screen to obtain the converted text describing the content of the image screen, which will not be limited herein.

In a possible implementation, in the case that the multimedia file includes a video file, the text conversion can be performed on each image frame of the video file through OCR technology to obtain the converted text. Alternatively, the content of the image screens of respective image frames of the video file is learned, and the text conversion is performed by summarizing the content of the image screens to obtain the converted text describing the content of the image screens. In addition, the text conversion can be performed on the audio in the video file through speech recognition to obtain the converted text, which will not be limited herein.

In a possible implementation, in the case that the multimedia file includes an audio file, the text conversion can be performed on the audio file through speech recognition to obtain the converted text.

In some other embodiments, in the case that the original data includes a link address used for obtaining the text, S1420 can further include: acquiring a target article based on the link address; extracting an article text in the target article; and using the article text as the target text.

As an example, in response to the video generation operation, the electronic device can determine the data type of the original data. In the case that the data type of the original data is determined as a type of address, the target article is acquired based on the link address, and the article text in the target article is directly extracted. Then, the extracted article text is used as the target text.

In a possible implementation, the electronic device can determine the data type of the original data through a control that receives the original data.

Referring back to FIG. 3, in response to receiving a trigger operation inputted by the user on the "Generate Video" button 307, the electronic device determines that the control that receives the original data is the "Article Link" input box 304. In this case, the electronic device may determine the data type of the original data is a type of address, extract the link address in the original data, acquire the target article based on the link address, directly extract the article text in the target article, and then use the extracted article text as the target text.

In S1430, a subtitle text is generated based on the target text.

In some embodiments of the present disclosure, the subtitle text is generated based on the target text by the following steps:

performing a text summarization extraction on the target text to obtain a summarization of the target text; and performing a text typesetting on the summarization, to obtain the subtitle text corresponding to the summarization.

In some embodiments, the electronic device can directly input the target file into a preset summarization extraction model to obtain the summarization of the target text; and then directly input the obtained summarization into a preset text typesetting model, to obtain the subtitle text. The obtained subtitle text is in units of sentence and configured with appropriate punctuation marks, on which an across-line and across-page process is performed.

In some other embodiments, the electronic device can further screen out a similar article text whose similarity with the target text meets a preset text similarity threshold, in Internet article texts or local article texts, based on at least one of the title of the target text and the text content of the target text. If no similar article text is screened out, the target file can be directly input into the preset summarization extraction model to obtain the summarization of the target text. If similar article texts are screened out, a weighted summation of the target text and each similar article text can be calculated based on the length of the text, the number of likes, and the number of reposts to obtain the text score of each text. The text with the highest text score is selected, and then the selected text is inputted into the preset summarization extraction model to obtain the summarization of the target text. After the electronic device obtains the summarization, it can directly input the summarization into the preset text typesetting model to obtain the subtitle text. The subtitle text is in units of sentence and configured with appropriate punctuation marks, on which an across-line and across-page process is performed.

In a possible implementation, before the text typesetting is performed on the summarization, a text cleaning process can further be performed on sensitive keywords, such as organization names and user personal information, as well as special symbols that cannot generate voice audio, in the summarization. Then, the text typesetting is performed on cleaned summarization to obtain the subtitle text corresponding to the summarization.

In other embodiments of the present disclosure, the generating subtitle text based on the target text can further include: performing a text summarization extraction on the target text to obtain a summarization of the target text; and using the summarization as the subtitle text.

The method for obtaining the summarization of the target text by the electronic device is similar to the above embodiment, which will not be repeated here.

In S1440, multimedia material corresponding to the subtitle text is acquired.

In some embodiments, S1440 can further include:

determining a target material with the highest match with the subtitle text, from multiple preset materials, where the multiple preset materials include materials acquired based on the original data, and the preset material includes at least one of an image and a video; and using the target material as a multimedia material.

In an embodiment, the electronic device can first acquire multiple preset materials. The preset materials may include at least one of materials in a material library and materials in the Internet. When the original data includes a multimedia file and a link address, the electronic device can acquire at least one of materials in the image and the video based on the original data. The preset materials can further include materials acquired based on the original data.

In a possible implementation, the electronic device can determine a matching degree between each preset material and the corresponding subtitle text. The preset number of preset materials with the highest matching degree is selected for each subtitle text. The selected preset material is used as the target material corresponding to the subtitle text.

Further, the electronic device can input each preset material and each corresponding subtitle text into a preset image-text matching model to obtain an image-text matching score between each preset material and corresponding subtitle text. Then, a textual similarity between the text contained in each preset material and corresponding subtitle text is calculated, and then whether each preset material and the corresponding subtitle text have the same source is determined to obtain the source similarity. Finally, for each subtitle text, at least one of the image-text matching score, text similarity, source similarity, image clustering score of the preset material and the text weight of the text to which the preset material belongs is used for the weighted summation to obtain a matching degree of each preset material with respect to the subtitle text. Then, the preset number of preset materials with the highest matching degree is selected. The target material corresponding to the subtitle text is selected from the selected preset materials.

The text similarity can be calculated according to the subtitle text and the text contained in the preset material based on a preset text similarity algorithm. In an embodiment, the preset text similarity algorithm may be a text semantic similarity algorithm, or a text character similarity algorithm, which will not be limited herein.

In other embodiments, S1440 can further include: performing a text-to-speech conversion on the subtitle text to obtain a subtitle audio corresponding to the subtitle text; and using the subtitle audio as the multimedia material.

As an example, the electronic device can perform voice conversion on each subtitle text based on the text-to-speech conversion technology, to obtain a subtitle audio corresponding to each subtitle text. For example, the electronic device can input the subtitle text into a preset text-to-speech conversion model for voice conversion, to obtain the subtitle audio.

In some other embodiments, S1440 can further include:

inputting the target text into a preset text sentiment classification model for classification, to obtain a sentiment class of the target text;

determining a target background audio corresponding to the sentiment class, from the multiple preset background audios; and using the target background audio as the multimedia material.

As an example, the electronic device can be preset with multiple preset background audios. One preset background audio can correspond to one sentiment class. The sentiment class can include the class for indicating a classification to which the sentiment of the target text belongs, such as a joy class, sadness class, rigor class, tension class, etc. The electronic device inputs the target text into the preset text sentiment classification model for classification, to obtain the sentiment class of the target text; and determines the target background audio corresponding to the sentiment class among the multiple preset background audios, and then uses the target background audio as the multimedia material.

Hence, the electronic device can select appropriate background music from the multiple preset background audios to generate the target video, by performing sentiment analysis and classification on the target text.

In S1450, a target video is generated based on the subtitle text and the multimedia material.

In the case that the multimedia material includes at least one of images and videos, the subtitle text can be added at a preset position in each image and each image frame of the videos. Based on the arrangement order of respective subtitle texts, the images and videos are ordered to obtain dynamic images. Then, based on the preset display effect of the subtitle text and the display effect of the images and videos in the preset video template, video rendering is performed on the subtitle texts, images and videos in the dynamic images to obtain the target video.

In the case that the multimedia material includes a subtitle audio and at least one of images and videos, the subtitle text can be added at a preset position in each image and each image frame of the videos. Based on the arrangement order of respective subtitle texts, the images and videos are ordered. Then, based on the audio duration of the subtitle audio corresponding to each subtitle text and the number of images and videos corresponding to each subtitle text and the duration of each video, the display time and display duration of each image and video are determined. Based on the order of images and videos and the display time and display duration of each image and video, dynamic images are obtained. After that, based on the preset display effect of the subtitle text and the display effects of the images and videos in the preset video template, video rendering is performed on the subtitle texts, images and videos in the dynamic images to obtain the target video. Lastly, based on the correspondence relationship between a time stamp of each video frame in the target video and a time stamp of each audio frame of the subtitle audio, the target video and the subtitle audio are combined to obtain the combined target video.

In the case that the multimedia material includes a subtitle audio, a target background audio and at least one of images and videos, the subtitle text can be added at a preset position in each image and each image frame of the videos. Based on the arrangement order of the subtitle texts, the images and videos are ordered. Based on the audio duration of the subtitle audio corresponding to each subtitle text and the number of images and videos corresponding to each subtitle text and the duration of each video, the display time and display duration of each image and video are determined. Based on the order of images and videos and the display time and display duration of each image and video, dynamic images are obtained. After that, based on the preset display effect of the subtitle text in the preset video template and the display effects of the images and videos, video rendering is performed on the subtitle texts, images and videos in the dynamic images to obtain the target video. Then, based on a correspondence relationship between a time stamp of each video frame in the target video and a time stamp of the audio frame of the subtitle audio, the target video and the subtitle audio are combined to obtain the preliminarily combined target video. At last, based on a time stamp of each audio frame in the preliminarily combined target video and the target background audio, the target background audio is combined to the audio of the target video to obtain the ultimately combined target video.

In S1460, the generated target video is displayed.

Video elements of the target video include the subtitle text and the multimedia material corresponding to the subtitle text. The subtitle text is generated based on the target text, and the multimedia material is acquired based on the subtitle text.

It should be noted that S1460 is similar to S220 in the embodiment as shown in FIG. 2, the details of which will not be repeated herein.

In this way, in the embodiments of the present disclosure, materials such as images, videos, and audios can be automatically matched and automatically rendered based on the target text involved in the original data, to generate a segment of target video corresponding to the target text, which improves the intelligence of the electronic device.

In other embodiments of the present disclosure, after S1420 and before S1450, the video display method may further include: inputting the target text into a preset text content classification model for classification, to obtain a content class of the target text; and determining a target video template corresponding to the content class, from multiple preset video templates.

Correspondingly, S1450 can further include: generating the target video based on the subtitle text, the multimedia material and the target video template.

In a possible implementation, a process of determining the target video template corresponding to the target text may be performed in parallel with S1430 and S1440. Alternatively, it may be performed sequentially with S1430 and S1440 in a preset sequence.

In an embodiment, the electronic device can be preset with multiple video classification templates. One video classification template can correspond to one content class. The content class can include a class for indicating the classification to which the text content of the target text belongs, such as a news class, story class, diary class, show class, etc. After acquiring the target text, the electronic device may input the target text into the preset text content classification model for classification, to obtain the content class of the target text; and determine the target video template corresponding to the content class from multiple preset video templates. Then, the target video is generated based on the subtitle text, the multimedia material and the target video template. Alternatively, the content class may also be classified based on other classification methods. For example, the content of the target text is classified based on a keyword contained in the target text, which will not be limited herein Further, different video templates may further include different display effect elements. Hence, video rendering can be performed on the subtitle text and the multimedia material based on the preset display effect of the subtitle text and the display effect of the multimedia material in the target video template, to obtain the target video.

In this way, in the embodiments of the present disclosure, an appropriate target video template for generating the target video may be selected based on the content class of the target text, and an appropriate display effect may further be set for the subtitle text and the multimedia material.

In other embodiments of the present disclosure, in the case that the user inputs original data to the electronic device in the manual entering input mode, the electronic device can directly acquire the subtitle text and multimedia material inputted by the user, and automatically generate the target video.

In a possible implementation, in the case that the multimedia material includes at least one of images and videos, taking the multimedia material including images as an example, the electronic device may acquire the subtitle text and images inputted by the user. Based on the subtitle text, the image or video with the highest matching degree with the subtitle text is determined from the images inputted by the user, the preset images and videos. Then, the target video is automatically generated by using the subtitle text and the determined image or video.

In a possible implementation, the electronic device may further acquire the subtitle text and image inputted by the user, input the subtitle text into a preset text content classification model for classification, to obtain the content class of the subtitle text. Then, the target video template corresponding to the content class is determined from the multiple preset video templates. Lastly, the target video is automatically generated based on the subtitle text, the multimedia material and the target video template.

In this way, in the embodiments of the present disclosure, the original data such as the subtitle text and multimedia material manually inputted by the user can be used. The subtitle text is used as the target text, to automatically generate the target video corresponding to the subtitle text and multimedia material manually inputted by the user, thereby further improving user experience.

In still another implementation of the present disclosure, the electronic device can generate the target video through the server, so as to reduce the data processing workload of the electronic device and further improve the quality of the produced video.

In a possible implementation, after S210 and before S220, the video display method may further include: sending a video generation request carrying original data to the server, where the video generation request is used to request the server to provide the target video corresponding to the target text based on the original data; and receiving the target video fed back by the server.

As an example, after receiving the video generation operation, the electronic device can send a video generation request carrying original data to the server. The server generates and provides a target video corresponding to the target text based on the original data, in response to the video generation request. The electronic device may receive the target video fed back by the server and display the target video.

The server can automatically acquire the target text through the original data, automatically generate the subtitle text based on the target text, automatically acquire the multimedia material based on the subtitle text, and automatically generate the target video based on the subtitle text and the multimedia material. This process is similar to the aforementioned method for generating the target video by the electronic device, which will not be repeated here.

In this way, in the embodiments of the present disclosure, a target video can be fast and efficiently generated based on the original data through the interaction between the electronic device and the server, thereby improving the user experience.

In still some implementations of the present disclosure, in order to improve the entertainment of the target video, the video element can further include a preset avatar and a posture of the avatar. The posture of the avatar can be determined based on the subtitle text.

In an embodiment of the present disclosure, the avatar can be a virtual character object with a character image, or a virtual cartoon object with a cartoon image. The specific type of the avatar is not limited in the present disclosure.

Figure 15:
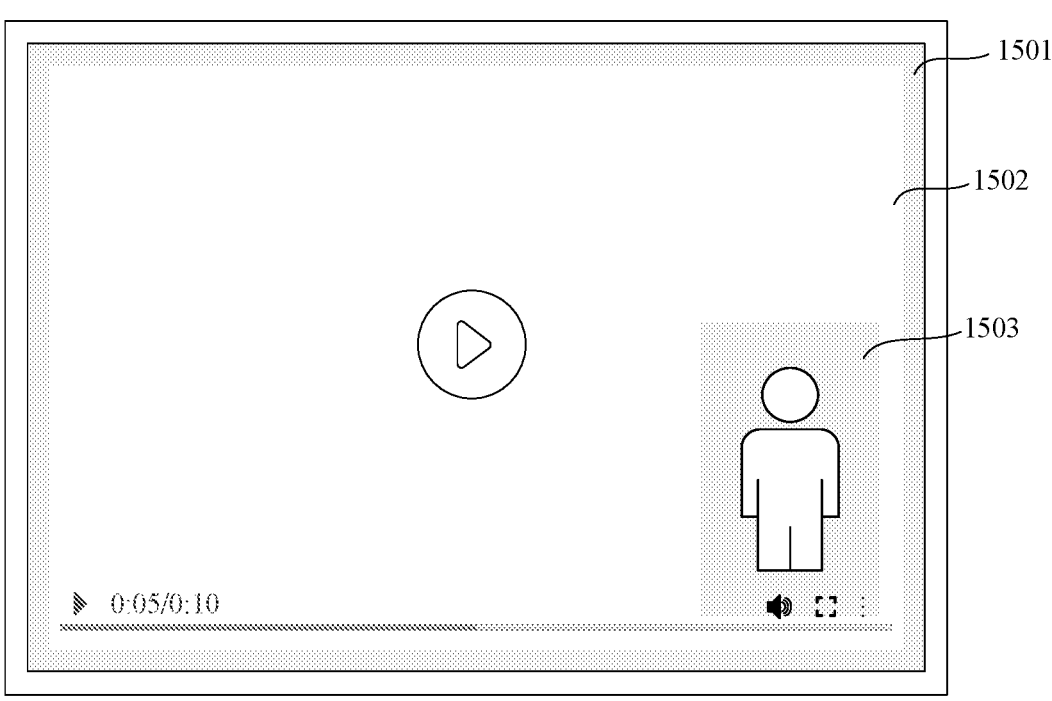
FIG. 15 is a schematic diagram of a video display interface according to yet another embodiment of the present disclosure.

FIG. 15 illustrates a schematic diagram of a video display interface according to yet another embodiment of the present disclosure. As shown in FIG. 15, after receiving the video generation operation, the electronic device may display a video display interface 1501 in response to the video generation operation, and display a playback window 1502 of the target video in the video display interface 1501 in the full screen manner. The target video displayed in the playback window 1502 can include an avatar 1503, such as a virtual character object. Taking the target video being a news broadcast video as an example, the virtual character object 1503 may be, for example, a virtual anchor of the news broadcast.

In an embodiment of the present disclosure, the posture of the avatar can include at least one of a mouth posture, a facial expression posture, a gesture posture and a body posture, which will not be limited herein.

In the case that a head image of the avatar is displayed in the target video, the posture of the avatar may include a mouth posture and a facial expression posture. In the case that an upper body image of the avatar is displayed in the target video, the posture of the avatar may include a mouth posture, a facial expression posture, and a gesture posture. In the case that a full-body image of the avatar is displayed in the target video, the posture of the virtual object may include a mouth posture, a facial expression posture, a gesture posture and a body posture. A posture type of the avatar is not limited in the present disclosure.

In an embodiment of the present disclosure, the posture of the avatar can be automatically determined based on the subtitle text.

In some embodiments, the posture of the avatar may be determined by the electronic device. In some other embodiments, the posture of the virtual object may also be determined by the server.

Since the method for determining the posture of the avatar by the electronic device is similar to the method for determining the posture of the avatar by the server. The details of will be described below by taking the avatar including a virtual character object and the electronic device performing the method for determining character posture as an example.

As an example, after obtaining the subtitle audio, the electronic device inputs the subtitle audio into the preset posture generation model to obtain real-time character posture animation, and uses posture transfer technology to transfer the real-time character posture animation to the object model of the virtual character object, so as to obtain an object model of the virtual character object that broadcasts the subtitle text. The character posture image of the virtual character object corresponding to each audio frame of the subtitle audio can be acquired based on the obtained object model. Base on time stamps of the respective audio frames in the target video that is generated based on the subtitle text and the multimedia material, the corresponding character posture images are combined with the target video to obtain the combined target video with the virtual character object.

In the case that the object model of the virtual character object is the head model of the virtual character object, the preset posture generation model can be used to generate a mouth posture animation and a facial expression posture animation. In the case that the object model of the virtual character object is the upper body model of the virtual character object, the preset posture generation model can be used to generate a mouth posture, a facial expression posture and a gesture posture. In the case that the object model of the virtual character object is a full-body model of the virtual character object, the preset posture generation model can be used to generate a mouth posture, a facial expression posture, a gesture posture and a body posture.

In some embodiments of the present disclosure, before the posture of the avatar is determined, an avatar similar to the image of the user may be generated.

In a possible implementation, the avatar may be generated before or after the subtitle audio is generated, which will not be limited herein.

In some embodiments, in the case that the posture of the avatar is determined by the electronic device, the electronic device may first collect the user image, and then input the user image into a preset biometric feature extraction model to extract the user biometric features in the user image. After that, the extracted user biometric features are input into a preset object generation model to obtain a primary object model of the avatar with the user biometric features. Finally, a preset clothing model is combined with the primary object model to obtain an ultimate object model of the avatar.

In a possible implementation, the user image may be a collected image captured by the user through a camera, or may be a collected image selected by the user from preset images.

In a possible implementation, the user image may be the face image, upper body image or whole-body image of the user, which will not be limited here.

In a possible implementation, the biometric features of the user extracted by the electronic device may include at least one of a face feature, a head and shoulder feature and a body shape feature of the user, which will not be limited herein.

For example, in the case that the user image is a face image, the extracted user biometric features may include face features of the user. For another example, in the case that the user image is a full-body image, the extracted user biometric features may include face features and body shape features of the user.

In a possible implementation, in the case that the user image is a face image, the preset object generation model can be used to generate a head model. In the case that the user image is an upper body image, the preset object generation model can be used to generate an upper body model. In the case that the user image is a whole-body image, the preset object generation model can be used to generate the whole-body model.

In some other embodiments, in the case that the posture of the avatar is determined by the server, the electronic device can first collect the user image, and extract the user biometric features from the user image, and then send the extracted user biometric features to the server. The server generates the object model of the avatar based on the user biometric features. The method for generating the object model by the server is similar to the above method for generating the object model by the electronic device, which will not be repeated here.

In some other embodiments of the present disclosure, before determining the posture of the avatar, an avatar similar to the image and costume of user can further be generated.

In a possible implementation, the avatar can be generated before or after the subtitle audio is generated, which will not be limited herein.

In some embodiments, in the case that the posture of the avatar is determined by the electronic device, the electronic device may first collect the user image, input the user image into a preset biometric feature extraction model to extract the user biometric features in the user image, and then input the user image into a preset costume feature extraction model to extract the user costume feature in the user image. Then, the extracted user biometric features are input into the preset object generation model to obtain a primary object model of the avatar with the user biometric features. Based on a preset correspondence relationship between costume styles and costume models, the target costume model corresponding to the user costume style to which the user costume feature belongs is searched from the preset costume models. Then, the target costume model is combined with the primary object model to obtain the object model of the avatar with the user costume feature.

In a possible implementation, the extracted user costume feature can include at least one of a facial ornament feature, a head ornament feature, a clothing feature, and a clothing accessories feature.

For example, in the case that the user image is a face image, the extracted user biometric features can include face features of the user, and the extracted user costume feature can include a head ornament feature. For another example, in the case that the user image is a full-body image, the extracted user biometric features can include face features and body shape features of the user, and the extracted user costume feature may include a facial ornament feature, a head ornament feature, a clothing feature, and a clothing accessories feature.

In a possible implementation, the electronic device may input the user costume feature into a preset costume style classification model, so as to determine the user costume style of the user costume feature.

The costume style may include intelligent, cute, handsome, calm, and sunny style so on.

In some other embodiments, in the case that the posture of the avatar is determined by the server, the electronic device can first collect the user image, extract the user biometric feature and user costume feature in the user image, and then send the extracted user biometric feature and user costume feature to the server. The server generates an object model of the avatar based on the user biometric feature and user costume feature. The method for generating the object model by the server is similar to the above method for generating the object model by the electronic device, which will not be repeated here.

In some other embodiments of the present disclosure, in the case that the avatar similar to the user image and costume is generated before generating the subtitle audio, the electronic device or server can further generate the subtitle audio based on the costume style of the avatar. The subtitle audio has sound features consistent with the costume feature of the avatar.

Taking subtitle audio generated by the electronic device as an example, the electronic device can be preset with multiple text-to-speech conversion models. One text-to-speech conversion model corresponds to one costume style. The electronic device may select a target text-to-speech conversion model corresponding to the costume style of the avatar from the multiple text-to-speech conversion models. The subtitle text is inputted into the target text-to-speech conversion model for voice conversion, to obtain the subtitle audio. In this way, the audio with sound features consistent with the costume features of the avatar is generated, further improving the user experience.

Hereinafter, a video processing method according to an embodiment of the present disclosure will be described according to the architecture shown in FIG. 1 with reference to FIG. 16. In the embodiments of the present disclosure, the video processing method can be implemented by a server, such as the server 102 in the server shown in FIG. 1. The server can include devices with storage and computing functions such as cloud servers or server clusters.

Figure 16:
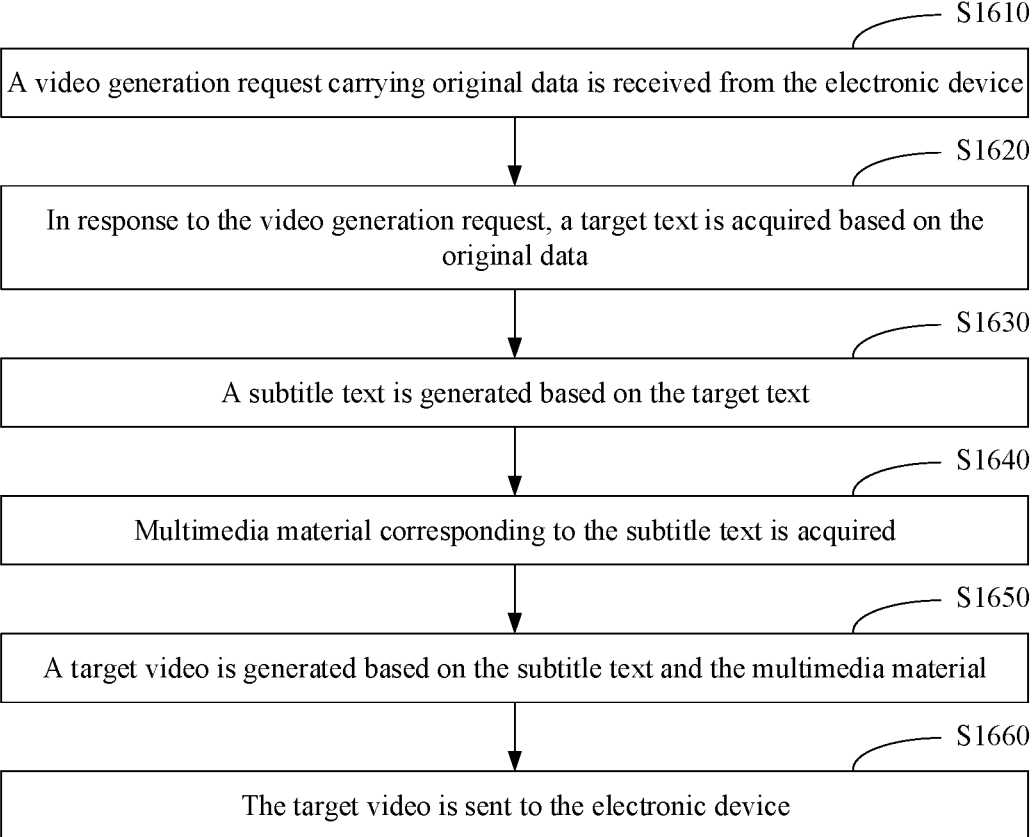
FIG. 16 is a schematic flowchart of a video processing method according to an embodiment of the present disclosure.

FIG. 16 illustrates a schematic flowchart of a video display method according to an embodiment of the present disclosure.

As shown in FIG. 16, the video processing method can include the following steps S1610-S16600.

In S1610, a video generation request carrying original data is received from the electronic device.

As an example, after receiving the video generation operation for the original data by the user, the electronic device can send a video generation request carrying the original data to the server in response to the video generation operation. The server receives the video generation request carrying the original data from the electronic device; and provides a target video corresponding to the target text based on the original data, in response to the video generation request.

The electronic device can be the electronic device 101 in the client side as shown in FIG. 1.

In S1620, a target text is acquired based on the original data in response to the video generation request.

In some embodiments of the present disclosure, the original data can include a character.

Correspondingly, S1620 can further include: extracting the character in the original data; and using the character as the target text.

As an example, in the case that the data type of the original data is determined as a type of character, the server can directly extract the character in the original data, and use the extracted character as the target text.

In a possible implementation, the video generation request may carry the data type of the original data, and the data type of the original data can be determined by the electronic device through a control for receiving the original data.

In other embodiments of the present disclosure, the original data can include a multimedia file.

Correspondingly, S1620 can further include: performing a text conversion on the multimedia file to obtain the converted text; and using the converted text as the target text.

As an example, in the case that the data type of the original data is determined as a type of multimedia file, the server may perform text conversion on the multimedia file to obtain the converted text, and use the converted text as the target text.

In a possible implementation, the video generation request can carry the data type of the original data, and the data type of the original data can be determined by the electronic device through a control for receiving the original data.

In a possible implementation, in the case that the multimedia file includes an image file, the text conversion is performed on the image file by OCR technology to obtain the converted text. Alternatively, the content of the image screen of the image file can be learned, and the text conversion is performed by summarizing the content of the image screen, to obtain the converted text describing the content of the image screen, which will not be limited herein.

In a possible implementation, in the case that the multimedia file includes a video file, the text conversion can be performed on each image frame of the video file through OCR technology to obtain the converted text. Alternatively, the content of the image screens of image frames of the video file is learned, and the text conversion is performed by summarizing the content of the image screens to obtain the converted text describing the content of the image screens. In addition, the text conversion can be performed on the audio in the video file through speech recognition to obtain the converted text, which will not be limited herein.

In a possible implementation, in the case that the multimedia file includes an audio file, the text conversion can be performed on the audio file through speech recognition to obtain the converted text.

In some other embodiments of the present disclosure, the original data can include a link address, and the link address may be used to obtain article content.

Correspondingly, S1620 may further include: acquiring the target article based on the link address; extracting an article text in the target article; and using the article text as the target text.

As an example, in the case that the data type of the original data is determined as a type of address, the server can acquire the target article based on the link address, directly extract the article text in the target article, and then use the extracted article text as the target text.

In a possible implementation, the video generation request can carry the data type of the original data, and the data type of the original data can be determined by the electronic device through a control for receiving the original data.

In S1630, a subtitle text is generated based on the target text.

In some embodiments of the present disclosure, S1630 may further include: performing a text summarization extraction on the target text to obtain a summarization of the target text; and performing a text typesetting on the summarization to obtain the subtitle text corresponding to the summarization.

In some embodiments, the server can directly input the target file into a preset summarization extraction model to obtain the summarization of the target text, and then directly input the obtained summarization into a preset text typesetting model, so as to obtain the subtitle text. The obtained subtitle text is in units of sentence and configured with appropriate punctuation marks, on which an across-line and across-page process is performed.

In some other embodiments, the server can further screen out a similar article text whose similarity with the target text meets a preset text similarity threshold, in the Internet article texts or local article texts, based on at least one of the title of the target text and the text content of the target text. If no similar article text is screened out, the target file can be directly input into the preset summarization extraction model to obtain the summarization of the target text. If similar article texts are screened out, a weighted summation of the target text and each similar article text can be calculated based on the length of the text, the number of likes, and the number of reposts to obtain the text score of each text. The text with the highest text score is selected, and then the selected text is inputted into the preset summarization extraction model to obtain the summarization of the target text. After the electronic device obtains the summarization, it can directly input the summarization into the preset text typesetting model to obtain the subtitle text. The subtitle text is in units of sentence and configured with appropriate punctuation marks, on which an across-line and across-page process is performed.

In a possible implementation, before the text typesetting is performed on the summarization, a text cleaning process can further be performed on sensitive keywords, such as organization names and user personal information, as well as special symbols that cannot generate voice audio, in the summarization. Then, the text typesetting is performed on cleaned summarization to obtain the subtitle text corresponding to the summarization.

In other embodiments of the present disclosure, S1630 may further include: performing a text summarization extraction on the target text to obtain a summarization of the target text; and using the summarization as the subtitle text.

The method for obtaining the summarization of the target text by the server is similar to the above embodiment, which will not be repeated herein.

In S1640, multimedia material corresponding to the subtitle text is acquired.

In some embodiments, S1640 may further include: determining the target material having the highest match with the subtitle text, from multiple preset materials, where multiple preset materials include materials acquired based on the original data, and the preset material includes at least one of an image and a video; and using the target material as the multimedia material.

In an embodiment, the server can first acquire multiple preset materials. The preset materials may include at least one of materials in a material library and materials in the Internet. When the original data includes the multimedia file and the link address, the server can acquire at least one of materials in the image and the video based on the original data. The preset materials may further include materials acquired based on the original data.

In a possible implementation, the server can determine a matching degree between each preset material and the corresponding subtitle text. Then, for each subtitle text, the server selects a preset number of preset materials having the highest matching degree with the subtitle text. The selected preset material is used as the target material corresponding to the subtitle text.

Further, the server can input each preset material and each corresponding subtitle text into a preset image-text matching model to obtain an image-text matching score between each preset material and corresponding subtitle text. Then, a textual similarity between the text contained in each preset material and corresponding subtitle text is calculated, and then whether each preset material and the corresponding subtitle text have the same source is determined to obtain the source similarity. Finally, for each subtitle text, at least one of the image-text matching score, text similarity, source similarity, image clustering score of the preset material and the text weight of the text to which the preset material belongs is used for the weighted summation to obtain a matching degree of each preset material with respect to the subtitle text. Then, the preset number of preset materials with the highest matching degree is determined. The target material corresponding to the subtitle text is selected from the selected preset materials.

The text similarity can be calculated according to the subtitle text and the text contained in the preset material based on a preset text similarity algorithm. In an embodiment, the preset text similarity algorithm may be a text semantic similarity algorithm, or a text character similarity algorithm, which will not be limited herein.

In other embodiments, S1640 can further include: performing a text-to-speech conversion on the subtitle text to obtain a subtitle audio corresponding to the subtitle text; and using the subtitle audio as the multimedia material.

As an example, the server can perform voice conversion on each subtitle text based on the text-to-speech conversion technology, to obtain a subtitle audio corresponding to each subtitle text. For example, the server can input the subtitle text into a preset text-to-speech conversion model for voice conversion, to obtain the subtitle audio.

In some other embodiments, S1640 may further include: inputting the target text into a preset text sentiment classification model for classification, to obtain a sentiment class of the target text; determining a target background audio corresponding to the sentiment class, from the multiple preset background audios; and using the target background audio as the multimedia material.

As an example, the server can be preset with multiple preset background audios. One preset background audio can correspond to one sentiment class. The sentiment class can include the class for indicating a classification to which the sentiment of the target text belongs, such as a joy class, sadness class, rigor class, tension class, etc. The server inputs the target text into the preset text sentiment classification model for classification, to obtain the sentiment class of the target text; and determines the target background audio corresponding to the sentiment class among the multiple preset background audios, and then uses the target background audio as the multimedia material.

Hence, the server can select appropriate background music from the multiple preset background audios to generate the target video, by performing sentiment analysis and classification on the target text.

In S1650, a target video is generated based on the subtitle text and the multimedia material.

In some embodiments of the present disclosure, the server can directly generate the target video based on the subtitle text and the multimedia material.

In this case, the video element can include the subtitle text and multimedia material.

In the case that the multimedia material includes at least one of images and videos, the subtitle text can be added at a preset position in each image and each image frame of the videos. Based on the arrangement order of respective subtitle text, the images and videos are ordered to obtain dynamic images. Then, based on the preset display effect of the subtitle text and the display effect of the images and videos in the preset video template, video rendering is performed on the subtitle texts, images and videos in the dynamic images to obtain the target video.

In the case that the multimedia material includes a subtitle audio and at least one of images and videos, the subtitle text can be added at a preset position in each image and each image frame of the videos. Based on the arrangement order of respective subtitle texts, the images and videos are ordered. Then, based on the audio duration of the subtitle audio corresponding to each subtitle text and the number of images and videos corresponding to each subtitle text and the duration of each video, the display time and display duration of each image and video are determined. Based on the order of images and videos and the display time and display duration of each image and video, dynamic images are obtained. After that, based on the preset display effect of the subtitle text and the display effects of the images and videos in the preset video template, video rendering is performed on the subtitle texts, images and videos in the dynamic images to obtain the target video. Lastly, based on the correspondence relationship between a time stamp of each video frame in the target video and a time stamp of each audio frame of the subtitle audio, the target video and the subtitle audio are combined to obtain the combined target video.

In the case that the multimedia material includes a subtitle audio, a target background audio and at least one of images and videos, the subtitle text can be added at a preset position in each image and each image frame of the videos. Based on the arrangement order of the subtitle texts, the images and videos are ordered. Based on the audio duration of the subtitle audio corresponding to each subtitle text and the number of images and videos corresponding to each subtitle text and the duration of each video, the display time and display duration of each image and video are determined. Based on the order of images and videos and the display time and display duration of each image and video, dynamic images are obtained. After that, based on the preset display effect of the subtitle text and the display effects of the images and videos in the preset video template, video rendering is performed on the subtitle texts, images and videos in the dynamic images to obtain the target video. Then, based on a correspondence relationship between a time stamp of each video frame in the target video and a time stamp of the audio frame of the subtitle audio, the target video and the subtitle audio are combined to obtain the preliminarily combined target video. At last, based on a time stamp of each audio frame in the preliminarily combined target video and the target background audio, the target background audio is combined to the audio of the target video to obtain the ultimately combined target video.

In other embodiments of the present disclosure, after S1620 and before S1650, the video processing method may further include: inputting the target text into a preset text content classification model for classification, to obtain a content class of the target text; and determining a target video template corresponding to the content class, from multiple preset video templates.

Correspondingly, S1650 can further include: generating the target video based on the subtitle text, the multimedia material and the target video template.

In an embodiment, the server can be preset with multiple video classification templates. One video classification template can correspond to one content class. The content class can include a class for indicating the classification to which the text content of the target text belongs, such as a news class, story class, diary class, show class, etc. After acquiring the target text, the server may input the target text into the preset text content classification model for classification, to obtain the content class of the target text, and determine the target video template corresponding to the content class from multiple preset video templates. Then, the target video is generated based on the subtitle text, the multimedia material and the target video template. Alternatively, the content class may also be classified based on other classification methods. For example, the content of the target text is classified based on a keyword contained in the target text, which will not be limited herein.

Further, different video templates may further include different display effect elements. Hence, video rendering can be performed on the subtitle text and the multimedia material based on the preset display effect of the subtitle text and the display effect of the multimedia material in the target video template, to obtain the target video.

In this way, in the embodiments of the present disclosure, an appropriate target video template for generating the target video may be selected based on the content class of the target text, and an appropriate display effect may further be set for the subtitle text and the multimedia material.

In some other embodiments of the present disclosure, after S1620 and before S1650, the video processing method may further include: determining a posture of an avatar based on the subtitle text.

Correspondingly, S1650 may further include: generating the target video based on the subtitle text, multimedia material, the avatar and the posture of the avatar.

In this case, the video elements can further include a preset avatar and a posture of the avatar.

In an embodiment of the present disclosure, the avatar can be a virtual character object with a character image, or a virtual cartoon object with a cartoon image. The specific type of the avatar is not limited in the present disclosure.

In an embodiment of the present disclosure, the posture of the avatar may include at least one of a mouth posture, a facial expression posture, a gesture posture and a body posture, which will not be limited herein.

In the case that a head image of the avatar is displayed in the target video, the posture of the avatar may include a mouth posture and a facial expression posture. In the case that an upper body image of the avatar is displayed in the target video, the posture of the avatar may include a mouth posture, a facial expression posture, and a gesture posture. In the case that a full-body image of the avatar is displayed in the target video, the posture of the avatar may include a mouth posture, a facial expression posture, a gesture posture and a body posture. A posture type of the virtual object is not limited in the present disclosure.

As an example, after obtaining the subtitle audio, the server inputs the subtitle audio into the preset posture generation model to obtain real-time character posture animation, and uses posture transfer technology to transfer the real-time character posture animation to the object model of the virtual character object, so as to obtain an object model of the virtual character object that broadcasts the subtitle text. The character posture image of the virtual character object corresponding to each audio frame of the subtitle audio can be acquired based on the obtained object model. Base on time stamp of respective audio frames in the target video that is generated based on the subtitle text and the multimedia material, the corresponding character posture images are combined with the target video to obtain the combined target video with the virtual character object.

In the case that the object model of the virtual character object is the head model of the virtual character object, the preset posture generation model can be used to generate a mouth posture animation and a facial expression posture animation. In the case that the object model of the virtual character object is the upper body model of the virtual character object, the preset posture generation model can be used to generate a mouth posture, a facial expression posture and a gesture posture. In the case that the object model of the virtual character object is a full-body model of the virtual character object, the preset posture generation model can be used to generate a mouth posture, a facial expression posture, gesture a posture and a body posture.

In a possible implementation, before determining the posture of the virtual object based on the subtitle text, the video processing method may further include: generating an avatar similar to the image of the user.

In some embodiments, the electronic device may send the user image to the server, and the server can input the received user image into a preset biometric feature extraction model to extract the user biometric features in the user image, and then input the extracted user biometric features into the preset object generation model to obtain a primary object model of the avatar with the user biometric features. Finally, the preset clothing model is combined to the primary object model to obtain an ultimate object model of the avatar.

In some other embodiments, the electronic device can send the user image to the server. The server can input the received user image into a preset biometric feature extraction model to extract the user biometric features in the user image, and input the user image into the preset costume feature extraction model to extract the user costume feature in the user image. Then, the extracted user biometric features are inputted into the preset object generation model to obtain a primary object model of the avatar with the user biometric features. Based on a preset correspondence relationship between costume styles and costume models, the target costume model corresponding to the user costume style to which the user costume feature belongs is searched from the preset costume models. Then, the target costume model is combined with the primary object model to obtain the object model of the avatar with the user costume feature.

In a possible implementation, the extracted user costume feature can include at least one of the facial ornament feature, a head ornament feature, a clothing feature, and a clothing accessories feature.

In some other embodiments, when generating an avatar similar to the user image and user costume before generating the subtitle audio, the server may also generate the subtitle audio based on the costume style of the avatar. The subtitle audio has sound features consistent with the costume feature of the avatar.

In S1660, the target video is sent to the electronic device.

In an embodiment, after generating the target video, the server may send the target video to the electronic device, so that the electronic device displays the target video.

In the embodiments of the present disclosure, the video generation request carrying the original data is received from the electronic device. In response to the video generation request, the target text is automatically acquired based on the original data. The subtitle text is automatically generated based on the target text, and the multimedia material corresponding to the subtitle text is automatically acquired, so as to automatically generate the target video based on the subtitle text and multimedia material. It can be seen that enriched multimedia materials can be automatically found in the generation process of the target video, rather than searching for materials for producing videos by the users manually, which can not only reduce the time cost of producing videos, but also improve the quality of the produced videos.

Further, a video processing system is provided according to an embodiment of the present disclosure, which can include an electronic device and a server, thereby implementing the architecture shown in FIG. 1.

The electronic device may be configured to receive a video generation operation for original data, the original data is used to acquire a target text, and the video generation operation is used to trigger a generation of a target video corresponding to the target text; send a video generation request carrying original data to the server in response to the video generation operation; receive the target video from the server; and display the target video.

The server can be configured to receive the video generation request carrying original data from the electronic device; acquire a target text based on the original data in response to the video generation request; generate a subtitle text based on the target text; acquire a multimedia material corresponding to the subtitle text; generate a target video based on the subtitle text and the multimedia material; and send the target video to the electronic device.

It should be noted that the video display device can implement the various steps in the method embodiments shown in FIGS. 2 to 15 and realize the various processes and effects in the method embodiments shown in FIGS. 2 to 15. The video processing device can implement each step in the method embodiment shown in FIG. 16 and realize each process and effect in the method embodiment shown in FIG. 16. The details of the video display device and video processing device will not be repeated herein.

In an embodiment of the present disclosure, after receiving the video generation operation for the original data, the electronic device can send a video generation request carrying the original data to the server. After receiving the video generation request carrying the original data sent from the electronic device, the server can automatically acquire the target text based on the original data, automatically generate the subtitle text based on the target text, and automatically acquiring the multimedia material corresponding to the subtitle text, automatically generate the target video based on the subtitle text and multimedia material and send the target video to the electronic device. In this way, the electronic device can display the target video after receiving the target video fed back from the server. Thus, enriched multimedia materials can be automatically found in the generation process of the target video, rather than search for the materials of the video producing manually by the users. As a result, it can not only reduce the time cost of producing the video, but also improve the quality of the video produced.

Figure 17:
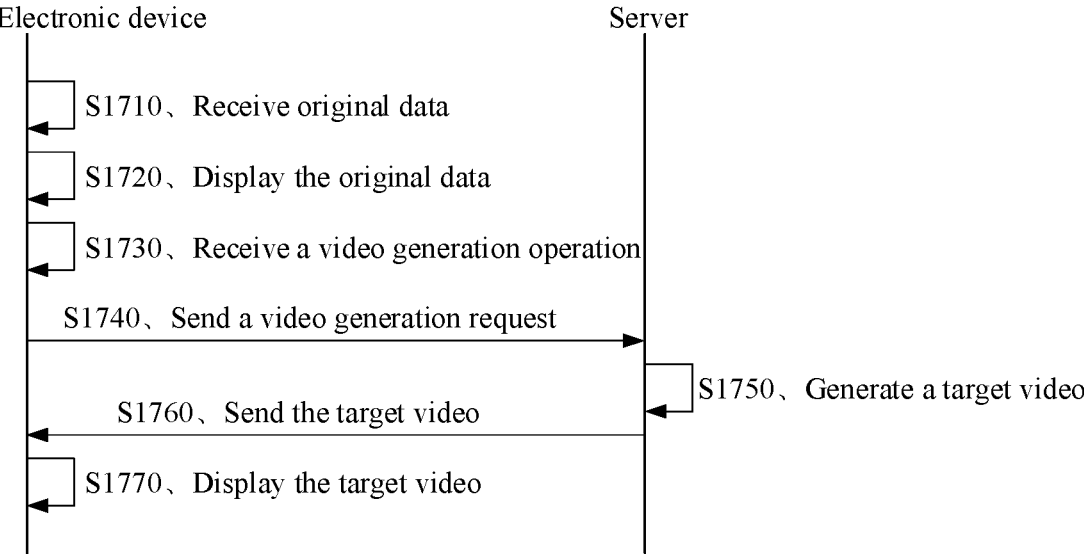
FIG. 17 is a schematic diagram of an interaction process of a video processing system according to an embodiment of the present disclosure.

FIG. 17 illustrates a schematic diagram of an interaction process of a video processing system according to an embodiment of the present disclosure. As shown in FIG. 17, a video display method can include the following steps S1710-S1770.

In S1710, the electronic device may receive original data inputted by the data input operation of the user, or receive original data sent by other devices.

The original data may include at least one of a character, a link address and a multimedia file, which will not be repeated herein.

In S1720, the electronic device may display the received original data.

In S1730, if the user desires to use the original data to generate a video, a video generation operation for the original data can be inputted into the electronic device.

The video generation operation may be a trigger operation such as long pressing, double clicking, voice control, or expression control on the original data. Alternatively, the video generation operation may also be a trigger operation such as clicking, long pressing, and double clicking on the video generation trigger control, which will not be repeated herein.

In S1740, the electronic device may send a video generation request carrying the original data to the server.

In S1750, after receiving the video generation request, the server may generate a target video based on the original data in response to the video generation request.

The server can automatically acquire the target text through the original data, automatically generate the subtitle text based on the target text, automatically acquire the multimedia material based on the subtitle text, and automatically generate the target video based on the subtitle text and the multimedia material, which is similar to the aforementioned method for generating target video, and is not repeated herein.

In S1760, after generating the target video, the server may send the target video to the electronic device.

In S1770, after receiving the target video from the server, the electronic device may display the received target video.

Figure 18:
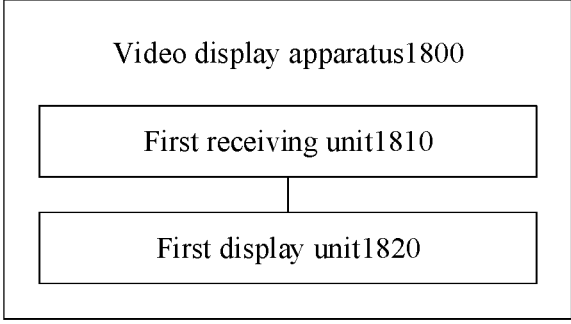
FIG. 18 is a schematic structural diagram of a video display apparatus according to an embodiment of the present disclosure.

FIG. 18 illustrates a schematic structural diagram of a video display apparatus according to an embodiment of the present disclosure.

In an embodiment of the present disclosure, the video display apparatus 1800 shown in FIG. 18 may be arranged in an electronic device, such as the electronic device 101 in the client side shown in FIG. 1. The electronic device may include a device with a communication function such as a mobile phone, a tablet computer, a desktop computer, s laptop, a vehicle terminal, a wearable device, an all-in-one computer, and a smart home device, as well as a device simulated by a virtual machine or simulator.

As shown in FIG. 18, the video display apparatus 1800 can include a first receiving unit 1810 and a first display unit 1820.

The first receiving unit 1810 may be configured to receive a video generation operation for original data, where the original data is used to acquire a target text, and the video generation operation is used to trigger a generation of a target video corresponding to the target text.

The first display unit 1820 may be configured to display the generated target video in response to the video generation operation, where a video element of the target video comprise a subtitle text and a multimedia material corresponding to the subtitle text, the subtitle text is generated based on the target text, and the multimedia material is acquired based on the subtitle text.

In the embodiments of the present disclosure, the video generation operation for the original data can be received. Since the original data can be used to acquire the target text, the video generation operation may be used to trigger the generation of the target video corresponding to the target text. Therefore, after receiving the video generation operation, the target video generated in response to the video generation operation can be displayed, and the video elements of the target video may include a subtitle text and a multimedia material corresponding to the subtitle text, where the subtitle text can be automatically generated based on the target text, and the multimedia material can be automatically acquired based on the subtitle text. Thus, enriched multimedia materials can be automatically found during the generation of the target video, rather than search for the materials for video producing manually by the users. As a result, it can not only reduce the time cost of producing the video, but also improve the quality of the video produced.

In some embodiments of the present disclosure, the video display device 1800 may further include a second display unit, a third receiving unit and a third display unit.

The second display unit may be configured to display a video editing interface in response to the video generating operation, wherein the video editing interface includes editable element, and the editable element include at least one of video elements and a display effect element corresponding to the video element.

The third receiving unit may be configured to receive an element modification operation on the editable element.

The third display unit may be configured to display a modified target video in response to the element modification operation, where the modified target video includes the editable element displayed in the video editing interface when the element modification operation is completed.

In some embodiments of the present disclosure, the video display device 1800 may further include a fourth display unit, a fourth receiving unit and a fifth display unit.

The fourth display unit may be configured to display an indication identifier, where the indication identifier indicates that the target video has been generated.

The fourth receiving unit may be configured to receive an identifier trigger operation on the indication identifier.

The fifth display unit may be configured to hide the original data in response to the identifier trigger operation.

In some embodiments of the present disclosure, the video display device 1800 may further include a second sending unit and a fifth receiving unit.

The second sending unit may be configured to send a video generation request carrying original data to the server, where the video generation request is used to enable the server provide the target video corresponding to the target text based on the original data.

The fifth receiving unit may be configured to receive the target video fed back from the server.

In some embodiments of the present disclosure, the video display device 1800 may further include a third acquiring unit, a third generating unit, a fourth acquiring unit, and a fourth generating unit.

The third acquiring unit may be configured to acquire the target text based on the original data.

The third generating unit may be configured to generate a subtitle text based on the target text.

The fourth acquiring unit may be configured to acquire the multimedia material corresponding to the subtitle text.

The fourth generating unit may be configured to generate the target video based on the subtitle text and the multimedia material.

In some embodiments of the present disclosure, the video elements may further include a preset avatar and a posture of the avatar, and the posture of the avatar may be determined based on the subtitle text.

It should be noted that the video display apparatus 1800 shown in FIG. 18 can implement each step in the method embodiments shown in FIG. 2 to FIG. 15, and realize each process and effects, which will not be repeated here.

Figure 19:
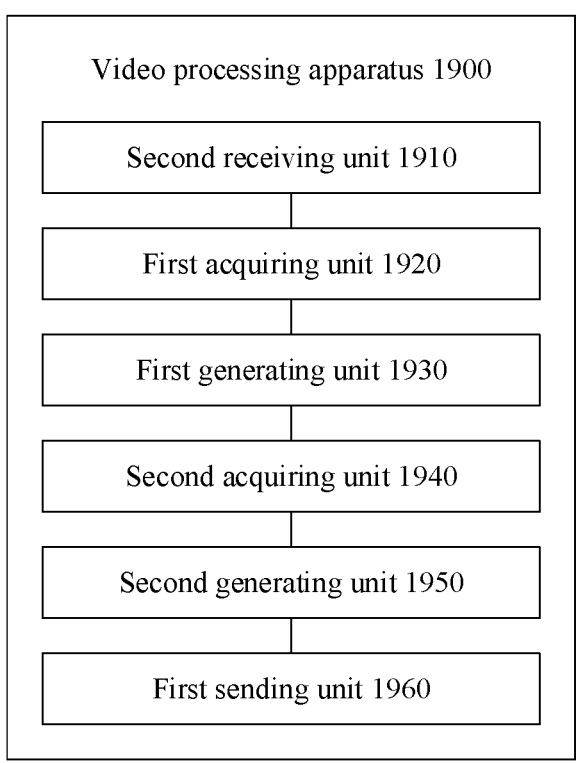
FIG. 19 is a schematic structural diagram of a video processing apparatus according to an embodiment of the present disclosure.

FIG. 19 illustrates a schematic structural diagram of a video processing apparatus 1900 according to an embodiment of the present disclosure.

In the embodiment of the present disclosure, the video processing apparatus 1900 may be a server, such as the server 102 in the server side shown in FIG. 1. The server may include a device with a storage and computing function such as a cloud server or a server cluster.

As shown in FIG. 19, the video processing apparatus 1900 can include a second receiving unit 1910, a first acquiring unit 1920, a first generating unit 1930, a second acquiring unit 1940, a second generating unit 1950 and a first sending unit 1960.

The second receiving unit 1910 may be configured to receive a video generation request carrying original data from the electronic device.

The first acquiring unit 1920 may be configured to acquire a target text based on the original data, in response to the video generation request.

The first generating unit 1930 may be configured to generate a subtitle text based on the target text.

The second acquiring unit 1940 may be configured to acquire a multimedia material corresponding to the subtitle text.

The second generating unit 1950 may be configured to generate a target video based on the subtitle text and multimedia material.

The first sending unit 1960 may be configured to send the target video to the electronic device.

In the embodiment of the present disclosure, the video generation request carrying the original data is received from the electronic device. In response to the video generation request, the target text is automatically acquired based on the original data. The subtitle text is automatically generated based on the target text, the multimedia material corresponding to the subtitle text is automatically acquired, and the target video is automatically generated based on the subtitle text and multimedia material. Thus, enriched multimedia materials can be automatically found in the generation process of the target video, rather than manually searching for materials for producing videos by the users, which can not only reduce the time cost of producing videos, but also improve the quality of the produced videos.

In some embodiments of the present disclosure, the first generating unit 1930 can include a summarization extracting sub-unit and a text typesetting sub-unit.

The summarization extracting sub-unit may be configured to perform a text summarization extraction on the target text to obtain a summarization of the target text.

The text typesetting sub-unit may be configured to perform a text typesetting on the summarization to obtain the subtitle text corresponding to the summarization.

In some embodiments of the present disclosure, the original data may include a character.

Correspondingly, the first acquiring unit 1920 may include a character extracting sub-unit and a first processing sub-unit.

The character extracting sub-unit may be configured to extract the character in the original data.

The first processing sub-unit may be configured to use the character as the target text.

In other embodiments of the present disclosure, the original data may include a multimedia file.

Correspondingly, the first acquiring unit 1920 may include a text conversion sub-unit and a second processing sub-unit.

The text conversion sub-unit may be configured to perform a text conversion on the multimedia file to obtain a converted text.

The second processing sub-unit may be configured to use the converted text as the target text.

In some other embodiments of the present disclosure, the original data may include a link address, and the link address may be used to acquire article content.

Correspondingly, the first acquiring unit 1920 may include an article acquiring sub-unit, an article extracting sub-unit and a third processing sub-unit.

The article acquiring sub-unit may be configured to acquire a target article based on the link address.

The article extracting sub-unit may be configured to extract an article text in the target article.

The third processing subunit may be configured to use the article text as the target text.

In some embodiments of the present disclosure, the second acquiring unit 1940 may include a fourth processing sub-unit and a fifth processing sub-unit.

The fourth processing sub-unit may be configured to determine a target material having a highest match with the subtitle text from multiple preset materials, where the multiple preset materials include materials acquired based on the original data, and the preset materials include at least one of images and videos.

The fifth processing sub-unit may be configured to use the target material as the multimedia material.

In some other embodiments of the present disclosure, the second acquiring unit 1940 may include a voice conversion sub-unit and a sixth processing sub-unit.

The voice conversion sub-unit may be configured to perform a text-to-speech conversion on the subtitle text, to obtain a subtitle audio based on the subtitle text.

The sixth processing sub-unit may be configured to use the subtitle audio as the multimedia material.

In some other embodiments of the present disclosure, the second acquiring unit 1940 may include a sentiment classification sub-unit, a seventh processing sub-unit and an eighth processing sub-unit.

The sentiment classification sub-unit may be configured to input the target text into a preset text sentiment classification model, to classify and obtain a sentiment class of the target text.

The seventh processing sub-unit may be configured to determine a target background audio corresponding to the sentiment class from multiple preset background audios.

The eighth processing subunit may be configured to use the target background audio as the multimedia material.

In some other embodiments of the present disclosure, the video processing apparatus 1900 may further include a content classification unit and a template determination unit.

The content classification unit may be configured to input the target text into a preset text content classification model for classification, to obtain a content class of the target text.

The template determination unit may be configured to determine a target video template corresponding to the content class from multiple preset video templates.

Correspondingly, the second generating unit 1950 may further be configured to generate the target video based on the subtitle text, the multimedia material and the target video template.

It should be noted that the video processing device 1900 shown in FIG. 19 may implement each step in the method embodiment shown in FIG. 16, and realize each process and effect in the method embodiment shown in FIG. 16, which will not be repeated here.

A computing device is provided according to an embodiment of the present disclosure, which may include a processor and a memory. The memory may be configured to store executable instructions. The processor may be configured to read executable instructions from the memory and execute the executable instructions to implement the video display method or the video processing method in the foregoing embodiments.

Figure 20:
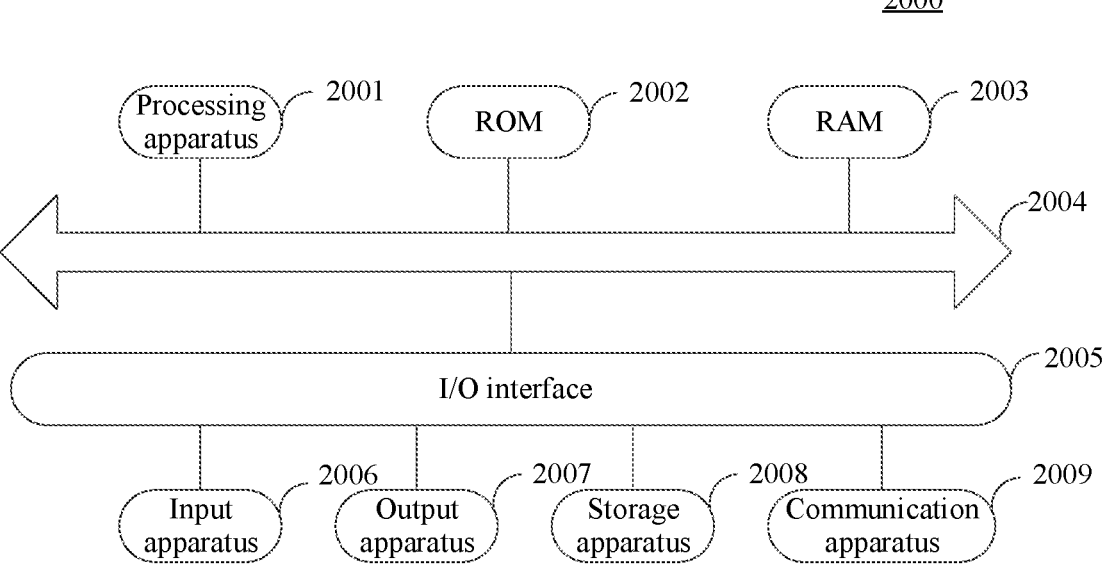
FIG. 20 is a schematic structural diagram of a computing device according to an embodiment of the present disclosure.

FIG. 20 illustrates a schematic structural diagram of a computing device according to an embodiment of the present disclosure. Referring specifically to FIG. 20 below, a schematic structural diagram of a computing device 2000 applicable for implementing embodiments of the present disclosure is shown.

In the embodiments of the present disclosure, the computing device may be an electronic device or a server. Electronic devices may include, but are not limited to, mobile terminals, such as mobile phones, laptops, digital broadcast receivers, PDAs (personal digital assistants), PADs (tablet computers), PMPs (portable multimedia players), vehicle-mounted terminals (such as in-vehicle navigation terminals), wearable devices and the like, and fixed terminals such as digital TVs, desktop computers, smart home devices and the like. The server may include cloud servers or server clusters and other devices with storage and computing functions.

It should be noted that the computing device 2000 shown in FIG. 20 is only an example, which should not limit the functions and usage scope of the embodiments of the present disclosure.

As shown in FIG. 20, the computing device 2000 may include a processing apparatus 2001 (such as a central processing unit and a graphics processor) which may execute various operations and processing through a program stored in a Read Only Memory (ROM) 2002 or a program loaded from the storage apparatus 2008 into a Random Access Memory (RAM) 2003. The RAM 2003 is further configured to store various programs and data required by the computing device 2000. The processing apparatus 2001, the ROM 2002 and the RAM 2003 are connected to each other via a bus 2004. An Input/output (I/O) interface 2005 is also connected to the bus 2004.

Generally, the I/O interface 2005 may be connected to: an input apparatus 2006, such as a touch screen, a touch panel, a keyboard, a mouse, a camera, a microphone, an accelerometer, and a gyroscope; an output apparatus 2007, such as a liquid crystal display (LCD), a speaker, and a vibrator; a storage apparatus 2008 such as a magnetic tape and a hard disk; and a communication apparatus 2009. The communication apparatus 2009 enables the computing device 2000 to perform wireless or wired communication with other devices for data exchanging. Although FIG. 20 shows a computing device 2000 having various components, it should be understood that the illustrated components are not necessarily required to all be implemented or included. Alternatively, more or fewer components may be implemented or included.

Further, a computer readable store medium is provided according to the present disclosure, the store medium storing a computer program thereon, the computer program, when executed by a processor, causes the processor to implement the video display method or the video processing method in the above embodiments.

Particularly, according to some embodiments of the present disclosure, the process described above in conjunction with flow charts may be implemented as a computer program. For example, a computer program product is further provided according to some embodiments of the present disclosure, including a computer program carried on a non-transitory computer readable medium. The computer program includes program codes for performing the method shown in the flow charts. In the embodiments, the computer program may be downloaded and installed from a network via the communication apparatus 2009, or installed from the storage apparatus 2008, or installed from the ROM 2002. When the computer program is executed by the processing apparatus 2001, the above-mentioned functions defined in the video display method and in the video processing method according to the embodiments of the present disclosure are performed.

It should be noted that, the computer readable medium mentioned herein may be a computer readable signal medium or a computer readable storage medium or any combination thereof. The computer readable storage medium may be, but is not limited to, a system, an apparatus, or a device in an electronic, magnetic, optical, electromagnetic, infrared, or semi-conductive form, or any combination thereof. The computer readable storage medium may be, but is not limited to, an electrical connection with one or more wires, a portable computer disk, a hard disk, a random access memory (RAM), a read-only memory (ROM), an erasable programmable read-only memory (EPROM or flash memory), an optical fiber, a portable compact disc read-only memory (CD-ROM), a light storage device, a magnetic storage device or any combination thereof. In some embodiments of the present disclosure, the computer readable storage medium may be any tangible medium containing or storing a program, and the program may be used by or in combination with an instruction execution system, apparatus, or device. In some embodiments of the present disclosure, the computer readable signal medium may be a data signal transmitted in a baseband or transmitted as a part of a carrier wave and carrying computer readable program codes. The transmitted data signal may be in various forms, including but not limited to an electromagnetic signal, an optical signal or any proper combination thereof. The computer readable signal medium may be any computer readable medium other than the computer readable storage medium and can send, propagate or transmit programs to be used by or with an instruction execution system, apparatus or device. The program codes stored in the computer readable medium may be transmitted via any proper medium including but not limited to: wired, optical fiber cable, radio frequency (RF), or any suitable combination of the foregoing.

In some embodiments, clients and servers can communicate using any currently known or future developed network protocols, such as HTTP, and can be interconnected with any form or medium of digital data communication (e.g., a communication network). Examples of communication networks include local area networks ("LANs"), wide area networks ("WANs"), internetworks (e.g., the Internet), and peer-to-peer networks (e.g., ad hoc peer-to-peer networks), as well as any currently known or future developed networks.

The above computer readable medium may be included in the above computing device or may exist independently without being assembled into the computing device.

The above computer readable medium carries one or more programs. When executed by the computing device, the above one or more programs can cause the computing device to:

receive a video generation operation for original data, where the original data is used to acquire a target text, and the video generation operation is used to trigger a generation of a target video corresponding to the target text; and display a generated target video in response to the video generation operation, where video elements of the target video comprise a subtitle text and a multimedia material corresponding to the subtitle text, the subtitle text is generated based on the target text, and the multimedia material is acquired based on the subtitle text; or receive a video generation request carrying original data from an electronic device; acquire a target text based on the original data, in response to the video generation request; generate a subtitle text based on the target text; acquire a multimedia material corresponding to the subtitle text; generate a target video based on the subtitle text and the multimedia material; and send the target video to the electronic device.

Computer program code for performing operations in embodiments of the present disclosure may be written in one or more programming languages, or a combination thereof. The programming language includes, but is not limited to, an object oriented programming language, such as Java, Smalltalk, and C++, or conventional procedural programming languages, such as "C" language and the like. The program code may be executed entirely on a user computer, or be executed partly on the user computer, or be executed as a stand-alone software package, or be executed partly on the user computer and partly on a remote computer or be executed entirely on the remote computer or server. In a case that the execution of the program code involves a remote computer, the remote computer may be connected to a user computer via any network, including a local area network (LAN) or a wide area network (WAN), or may be connected to an external computer (for example, via an Internet provided by an Internet service provider).

The flow charts and schematic diagrams in the Figures show the architecture, functionality and operations of possible implementations of the system, method and computer program product provided according to the embodiments of the present disclosure. Each of blocks in the flow charts or schematic diagrams may represent a module, a program segment, or a part of code, and the module, the program segment, or the part of code includes one or more executable instructions for implementing specified logical functions. It should be noted that in some alternative implementations, the functions noted in the blocks may be implemented in a different order than those illustrated in the Figures. For example, two blocks shown in succession may in fact be executed substantially in parallel, or sometimes be executed in a reverse order, depending upon functions involved. It should be further noted that each block in the schematic diagrams and/or flow charts, and combinations of blocks in the schematic diagrams and/or flowcharts, may be implemented by a dedicated hardware-based system configured to implement specified functions or operations, or may be implemented by using a combination of dedicated hardware and computer instructions.

The units mentioned in the description of the embodiments of the present disclosure may be implemented by means of software, or otherwise by means of hardware. The designation of a unit does not in any case constitute a limitation to the unit itself.

The functions described herein above may be executed at least in part by one or more hardware logic components. For example, without limitation, exemplary types of hardware logic components that may be used include: Field Programmable Gate Arrays (FPGAs), Application Specific Integrated Circuits (ASICs), Application Specific Standard Products (ASSPs), Systems on Chips (SOCs), Complex Programmable Logical Devices (CPLDs) and the like.

In the context of the present disclosure, a machine readable medium may be a tangible medium that may contain or store a program to be used by or in combination with an instruction execution system, apparatus or device. The machine readable medium may be a machine readable signal medium or a machine readable storage medium. The machine readable medium may include, but is not limited to, a system, an apparatus, or a device in an electronic, magnetic, optical, electromagnetic, infrared, or semi-conductive form, or any proper combination thereof. The machine readable storage medium may include an electrical connection based on one or more wires, a portable computer disk, a hard disk, a Random Access Memory (RAM), a Read Only Memory (ROM), an Erasable Programmable Read Only Memory (EPROM or flash memory), an optical fiber, a portable compact disc read only memory (CD-ROM), a light storage device, a magnetic storage device or any proper combination thereof.

The above description merely illustrates the preferred embodiments of the present disclosure and the technical principles employed. Those skilled in the art should understand that the scope of present disclosure is not limited to the technical solutions formed by certain combination of the above-mentioned technical features, and should also cover other technical solutions formed by any combination of the above-mentioned technical features and any equivalent features without departing from the disclosed concept, for example, a technical solution formed by replacing the features with the technical features disclosed in the present disclosure (but not limited to) with similar functions.

In addition, although the above operations are described in a specific order, it should not be understood that these operations are required to be performed in the specific order or performed in a sequential order. In some conditions, multitasking and parallel processing may be advantageous. Similarly, although multiple implementation details are included in the above descriptions, the details should not be interpreted as limitations to the scope of the present disclosure. Some features described in the context of an individual embodiment may also be implemented in combination in an individual embodiment. Otherwise, the features described in the context of an individual embodiment may be implemented individually or in any suitable sub-combination form in multiple embodiments.

Although the subject of the present disclosure has been described according to the structural features and/or logical actions of the method, it should be understood that the subject defined in the claims is not necessarily limited to the features or actions described above. Rather, the specific features and actions described above are only examples of the implementation of the claims.

The invention claimed is:

1. A video display method, comprising:
receiving a video generation operation for original data, wherein the original data is used to acquire a target text, and the video generation operation is used to trigger a generation of a target video corresponding to the target text; and
displaying a generated target video in response to the video generation operation, where video elements of the target video comprise a subtitle text and a multimedia material corresponding to the subtitle text, the subtitle text is generated based on the target text, and the multimedia material is acquired by acquiring a plurality of materials from a material library or Internet, determining a matching degree between each material of the plurality of materials and the subtitle text, and determining a target material having a highest matching degree with the subtitle text from the plurality of materials, as the multimedia material corresponding to the subtitle text.

2. The video display method according to claim 1, wherein after the receiving the video generation operation for the original data, the method further comprises:
displaying a video editing interface in response to the video generation operation, wherein the video editing interface comprises an editable element, the editable element comprises at least one of the video element and a display effect element corresponding to the video element;

receiving an element modification operation on the editable element; and displaying a modified target video, in response to the element modification operation, where the modified target video comprises the editable element displayed in the video editing interface when the element modification operation is completed.

3. The video display method according to claim 1, wherein before the displaying the generated target video, the method further comprises:

displaying an indication identifier, where the indication identifier indicates that the target video has been generated;

receiving an identifier trigger operation on the indication identifier; and hiding the original data, in response to the identifier trigger operation.

4. The video display method according to claim 1, wherein before the displaying the generated target video, the method further comprises:

sending a video generation request carrying the original data to a server, wherein the video generation request is used to enable the server to provide the target video corresponding to the target text based on the original data; and receiving the target video fed back from the server.

5. The video display method according to claim 1, wherein before the displaying the generated target video, the method further comprises:

acquiring the target text based on the original data;

generating a subtitle text based on the target text;

acquiring the multimedia material corresponding to the subtitle text; and generating the target video, based on the subtitle text and the multimedia material.

6. A video processing method, comprising:

receiving a video generation request carrying original data from an electronic device;

acquiring a target text based on the original data, in response to the video generation request;

generating a subtitle text based on the target text;

acquiring a multimedia material corresponding to the subtitle text, based on the subtitle text;

generating a target video, based on the subtitle text and the multimedia material; and sending the target video to the electronic device, wherein the acquiring a multimedia material corresponding to the subtitle text comprises:

acquiring a plurality of materials from a material library or Internet;

determining a matching degree between each material of the plurality of materials and the subtitle text; and determining a target material having a highest matching degree with the subtitle text from the plurality of materials, as the multimedia material.

7. The video processing method according to claim 6, wherein the generating a subtitle text based on the target text comprises:

performing a text summarization extraction on the target text to obtain a summarization of the target text; and performing a text typesetting on the summarization to obtain the subtitle text corresponding to the summarization.

8. The video processing method according to claim 6, wherein the original data comprises a character; the acquiring a target text based on the original data comprises:

extracting the character in the original data; and using the character as the target text.

9. The video processing method according to claim 6, wherein the original data comprises a multimedia file; and the acquiring a target text based on the original data comprises:

performing a text conversion on the multimedia file to obtain a converted text; and using the converted text as the target text.

10. The video processing method according to claim 6, wherein the original data comprises a link address, and the link address is used to acquire an article content;

the acquiring a target text based on the original data comprises:

acquiring a target article based on the link address;

extracting an article text in the target article; and using the article text as the target text.

11. The video processing method according to claim 6, wherein the acquiring a multimedia material corresponding to the subtitle text comprises:

performing a text-to-speech conversion on the subtitle text, to obtain a subtitle audio corresponding to the subtitle text; and using the subtitle audio as the multimedia material.

12. The video processing method according to claim 6, wherein the acquiring a multimedia material corresponding to the subtitle text comprises:

inputting the target text into a preset text sentiment classification model for classification, to obtain a sentiment class of the target text;

determining a target background audio corresponding to the sentiment class from a plurality of preset background audios; and using the target background audio as the multimedia material.

13. The video processing method according to claim 6, wherein after the acquiring a target text, and before the generating a target video based on the subtitle text and the multimedia material, the method further comprises:

inputting the target text into a preset text content classification model for classification, to obtain a content class of the target text;

determining a target video template corresponding to the content class from a plurality of preset video templates;

the generating a target video based on the subtitle text and the multimedia material comprises:

generating the target video based on the subtitle text, the multimedia material and the target video template.

14. A computing device, comprising:

a processor;

a memory configured to store executable instructions;

wherein the processor is configured to read the executable instructions from the memory, and execute the executable instructions to implement a video display method, wherein the video display method comprises:

receiving a video generation request carrying original data from an electronic device;

acquiring a target text based on the original data, in response to the video generation request;

generating a subtitle text based on the target text;

acquiring a multimedia material corresponding to the subtitle text, based on the subtitle text;

generating a target video, based on the subtitle text and the multimedia material; and sending the target video to the electronic device, wherein the acquiring a multimedia material corresponding to the subtitle text comprises:

acquiring a plurality of materials from a material library or Internet;

determining a matching degree between each material of the plurality of materials and the subtitle text; and determining a target material having a highest matching degree with the subtitle text from the plurality of materials, as the multimedia material.

15. A non-transitory computer readable store medium storing a computer program thereon, wherein the computer program, when executed by a processor, causes the processor to implement a video display method, wherein the video display method comprises:

receiving a video generation request carrying original data from an electronic device;

acquiring a target text based on the original data, in response to the video generation request;

generating a subtitle text based on the target text;

acquiring a multimedia material corresponding to the subtitle text, based on the subtitle text;

generating a target video, based on the subtitle text and the multimedia material; and sending the target video to the electronic device, wherein the acquiring a multimedia material corresponding to the subtitle text comprises:

acquiring a plurality of materials from a material library or Internet;

determining a matching degree between each material of the plurality of materials and the subtitle text; and determining a target material having a highest matching degree with the subtitle text from the plurality of materials, as the multimedia material.

16. The computing device according to claim 14, wherein after the receiving the video generation operation for the original data, the video display method further comprises:

displaying a video editing interface in response to the video generation operation, wherein the video editing interface comprises an editable element, the editable element comprises at least one of the video element and a display effect element corresponding to the video element;

receiving an element modification operation on the editable element; and displaying a modified target video, in response to the element modification operation, where the modified target video comprises the editable element displayed in the video editing interface when the element modification operation is completed.

17. The computing device according to claim 14, wherein before the displaying the generated target video, the video display method further comprises:

displaying an indication identifier, where the indication identifier indicates that the target video has been generated;

receiving an identifier trigger operation on the indication identifier; and hiding the original data, in response to the identifier trigger operation.

18. The computing device according to claim 14, wherein before the displaying the generated target video, the video display method further comprises:

sending a video generation request carrying the original data to a server, wherein the video generation request is used to enable the server to provide the target video corresponding to the target text based on the original data; and receiving the target video fed back from the server.

19. The computing device according to claim 14, wherein before the displaying the generated target video, the video display method further comprises:

acquiring the target text based on the original data;

generating a subtitle text based on the target text;

acquiring the multimedia material corresponding to the subtitle text; and generating the target video, based on the subtitle text and the multimedia material.

* * * * *